(12) United States Patent
Kander

(10) Patent No.: US 10,494,501 B2
(45) Date of Patent: Dec. 3, 2019

(54) NANOCOMPOSITE HEMP

(71) Applicant: Thomas Jefferson University, Philadelphia, PA (US)

(72) Inventor: Ronald Kander, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 0 days.

(21) Appl. No.: 16/395,397

(22) Filed: Apr. 26, 2019

(65) Prior Publication Data

US 2019/0330443 A1   Oct. 31, 2019

Related U.S. Application Data

(60) Provisional application No. 62/663,674, filed on Apr. 27, 2018.

(51) Int. Cl.

| | | |
|---|---|---|
| *C08K 3/04* | (2006.01) | |
| *C08J 3/20* | (2006.01) | |
| *C08G 63/08* | (2006.01) | |
| *B33Y 70/00* | (2015.01) | |
| *B33Y 10/00* | (2015.01) | |
| *H01B 1/24* | (2006.01) | |
| *B29C 64/118* | (2017.01) | |
| *B29K 67/00* | (2006.01) | |
| *B29K 55/02* | (2006.01) | |
| *B29K 511/10* | (2006.01) | |

(52) U.S. Cl.
CPC .............. *C08K 3/04* (2013.01); *B33Y 10/00* (2014.12); *B33Y 70/00* (2014.12); *C08G 63/08* (2013.01); *C08J 3/203* (2013.01); *B29C 64/118* (2017.08); *B29K 2055/02* (2013.01); *B29K 2067/046* (2013.01); *B29K 2511/10* (2013.01); *C08K 2201/001* (2013.01); *C08K 2201/005* (2013.01); *H01B 1/24* (2013.01)

(58) Field of Classification Search
CPC .................................... C08K 7/06; D01D 5/06
USPC ...................................................... 428/292.1
See application file for complete search history.

(56) References Cited

U.S. PATENT DOCUMENTS

| | | |
|---|---|---|
| 4,022,749 A | 5/1977 | Kuechler |
| 4,795,592 A | 1/1989 | Lander et al. |
| 5,994,443 A | 11/1999 | Ehrat et al. |

(Continued)

FOREIGN PATENT DOCUMENTS

| | | | | |
|---|---|---|---|---|
| CN | 103556256 A | * | 2/2014 | ............... D01D 5/06 |
| WO | WO/2004/099073 A2 | | 11/2004 | |

OTHER PUBLICATIONS

Aljaafari, et al., "Mechanical and Electrical Properties of Poly(Vinyl Chloride) Loaded with Carbon Nanotubes and Carbon Nanopowder", Journal of Thermoplastic Composite Materials, vol. 25, No. 6, Sep. 9, 2011, 679-699.

(Continued)

*Primary Examiner* — Khanh T Nguyen
(74) *Attorney, Agent, or Firm* — Vos-IP, LLC

(57) ABSTRACT

A composite material comprising a polymer and a carbonized hemp filler, wherein the carbonized hemp filler is produced by carbonizing hemp at a temperature of at least 1100 C to produce a char; and milling the char to produce a particle size, wherein the filler comprises 95% of particles of less than 10 microns in size; and wherein the hemp filler comprises between 1 and 50% of the total mass of the composite.

15 Claims, 17 Drawing Sheets

(56) References Cited

U.S. PATENT DOCUMENTS

| | | | |
|---|---|---|---|
| 6,348,536 | B1 | 2/2002 | Fourty et al. |
| 6,358,438 | B1 | 3/2002 | Isozaki et al. |
| 7,202,289 | B2 | 4/2007 | Nozaki et al. |
| 2007/0172638 | A1* | 7/2007 | Grove ..................... C08K 7/06 428/292.1 |
| 2011/0011960 | A1 | 1/2011 | Medoff |

OTHER PUBLICATIONS

Anne, "Environmental-Friendly Biodegradable Polymers and Composites", Integrated Waste Management, vol. 1, Aug. 23, 2011, 342-364.

Azeez, et al., "Application of Cryomilling to Enhance Material Properties of Carbon Nanotube Reinforced Chitosan Nanocomposites", Composites Part B: Engineering, vol. 50, Feb. 13, 2013, 127-134.

Balčiūnas, et al., "Physical Properties and Structure of Composite Made by Using Hemp Hurds and Different Binding Materials", Procedia Engineering, vol. 57, May 10, 2013, 159-166.

Boylan, "Smooth Operators: Carbon-Graphite Materials", Materials World, vol. 4, No. 12, 1996, 707-708.

Callister, et al., Materials Science and Engineering: An Introduction, 9th Edition, 2013.

Campbell, Structural Composite Materials, 2010.

Delogu, et al., "Fabrication of Polymer Nanocomposites via Ball Milling: Present Status and Future Perspectives", Progress in Materials Science, vol. 86, Jan. 5, 2017, 75-126.

Ebadi-Dehaghani, et al., "An Investigation on Compatibilization Threshold in the Interface of Polypropylene/Polylactic Acid Blends Using Rheological Studies", Journal of Vinyl and Additive Technology, vol. 22, No. 1, Aug. 4, 2014, 19-28.

Etaati, et al., "The Study of Fibre/Matrix Bond Strength in Short Hemp Polypropylene Composites from Dynamic Mechanical Analysis", Composites Part B: Engineering, vol. 62, Feb. 25, 2014, 19-28.

Fu, et al., "Effects of Particle Size, Particle/Matrix Interface Adhesion and Particle Loading on Mechanical Properties of Particulate-Polymer Composites", Composites Part B: Engineering, vol. 39, No. 6, Jan. 26, 2008, 933-961.

Gao, et al., "Highly Conductive Polymer Composites Based on Controlled Agglomeration of Carbon Nanotubes", Carbon, vol. 48, No. 9, Mar. 19, 2010, 2649-2651.

Garlotta, "A Literature Review of Poly(Lactic Acid)", Journal of Polymers and the Environment, vol. 9, No. 2, Apr. 2001, 63-84.

Giorcelli, et al., "Electrical Characterization of Different Carbon Based Polymer Composites", Biorefinery I: Chemicals and Materials from Thermo-Chemical Biomass Conversion and Related Processes, Nov. 3, 2015.

Halpin, et al., "The Halpin-Tsai Equations: A Review", Polymer Engineering and Science, vol. 16, No. 5, May 1976, 344-352.

Jamshidian, et al., "Poly-Lactic Acid: Production, Applications, Nanocomposites, and Release Studies", Comprehensive Reviews in Food Science and Food Safety, vol. 9, No. 5, Aug. 26, 2010, 552-571.

Kalaitzidou, et al., "A Route for Polymer Nanocomposites with Engineered Electrical Conductivity and Percolation Threshold", Materials, vol. 3, No. 2, Feb. 9, 2010, 1089-1103.

Kamthai, et al., "Thermal and Mechanical Properties of Polylactic Acid (PLA) and Bagasse Carboxymethyl Cellulose (CMCb) Composite by Adding Isosorbide Diesters", AIP Conference Proceedings 1664, May 22, 2015, 060006-1-060006-5.

Lee, et al., "Effects of Cryomilling on the Structures and Hydrogen Storage Characteristics of Multi-Walled Carbon Nanotubes", International Journal of Hydrogen Energy, vol. 35, No. 15, Jun. 16, 2010, 7850-7857.

Ma, et al., "Dispersion and Functionalization of Carbon Nanotubes for Polymer-Based Nanocomposites: A Review", composites Part A: Applied Science and Manufacturing, vol. 41, No. 10, Jul. 16, 2010, 1345-1367.

Mathew, et al., "The Effect of Morphology and Chemical Characteristics of Cellulose Reinforcements on the Crystallinity of Polylactic Acid", Journal of Applied Polymer Science, vol. 101, No. 1, Apr. 25, 2006, 300-310.

Mcguire, "Ceramics: Beyond the Coffee Mug", Today's Chemist at Work, May 2002.

Mittal, et al., "The Effects of Cryomilling CNTs on the Thermal and Electrical Properties of CNT/PMMA Composites", Polymers, vol. 8, No. 5, Apr. 26, 2016.

Mofokeng, et al., "Comparison of Injection Moulded, Natural Fibre-Reinforced Composites with PP and PLA as Matrices", Journal of Thermoplastic Composite Materials, vol. 25, No. 8, Nov. 2, 2011, 927-948.

Nan, et al., "The Effect of Bio-Carbon Addition on the Electrical, Mechanical, and Thermal Properties of Polyvinyl Alcohol/Biochar Composites", Journal of Composite Materials, vol. 50, No. 9, Jun. 4, 2015, 1161-1168.

Nat'l Conf. of State Legislators, "State Industrial Hemp Statutes", www.ncsl.org/research/agriculture-and-rural-development/state-industrial-hemp-statutes.aspx, Apr. 18, 2018.

Oral, "Determination of Elastic Constants of Epoxy Resin/Biochar Composites by Ultrasonic Pulse Echo Overlap Method", Polymer Composites, vol. 37, No. 9, Apr. 5, 2015, 2907-2915.

Panaitescu, et al., "Influence of Compatibilizing System on Morphology, Thermal and Mechanical Properties of High Flow Polypropylene Reinforced with Short Hemp Fibers", Composites Part B: Engineering, vol. 69, Oct. 13, 2014, 286-295.

Placet, "Characterization of the Thermo-Mechanical Behaviour of Hemp Fibres Intended for the Manufacturing of High Performance Composites", Composites Part A: Applied Science and Manufacturing, vol. 40, No. 8, May 13, 2009, 1111-1118.

Potts, et al., "Graphene-Based Polymer Nanocomposites", Polymer, vol. 52, No. 1, Dec. 2, 2010, 5-25.

Richard, et al., "Influence of Particle Size and Particle Loading on Mechanical and Dielectric Properties of Biochar Particulate-Reinforced Polymer Nanocomposites", International Journal of Polymer Analysis and Characterization, vol. 21, No. 6, Apr. 12, 2016, 462-477.

Saravanan, et al., "Graphene and Modified Graphene-Based Polymer Nanocomposites—A Review", Journal of Reinforced Plastics and Composites, vol. 33, No. 12, Feb. 20, 2014, 1158-1180.

Sassoni, et al., "Novel Sustainable Hemp-Based Composites for Application in the Building Industry: Physical, Thermal and Mechanical Characterization", Energy and Buildings, vol. 77, Mar. 25, 2014, 219-226.

Shahzad, "Hemp Fiber and Its Composites—A Review", Journal of Composite Materials, vol. 46, No. 8, Aug. 15, 2011, 973-986.

Shakoor, et al., "Mechanical and Thermal Characterisation of Poly (I-Lactide) Composites Reinforced with Hemp Fibres", Journal of Physics: Conference Series, vol. 451, 2013.

Snowdon, et al., "A Study of Carbonized Lignin as an Alternative to Carbon Black", ACS Sustainable Chemistry & Engineering, vol. 2, No. 5, Apr. 10, 2014, 1257-1263.

Stevulova, et al., "Testing Hemp Hurds Composites with Alternative Binder", Journal of Civil Engineering, Environment and Architecture, vol. 34, No. 64, Dec. 30, 2017, 61-66.

Wang, et al., "Dielectric Constant and Breakdown Strength of Polymer Composites with High Aspect Ratio Fillers Studied by Finite Element Models", Composites Science and Technology, vol. 76, Jan. 3, 2013, 29-36.

Wang, et al., "Dynamic Behavior and Flame Retardancy of HDPE/ Hemp Short Fiber Composites: Effect of Coupling Agent and Fiber Loading", Composite Structures, vol. 113, Mar. 11, 2014, 74-82.

Winey, et al., "Polymer Nanocomposites", MRS Bulletin, vol. 32, No. 4, Apr. 2007, 314-322.

Witkin, et al., "Synthesis and Mechanical Behavior of Nanostructured Materials via Cryomilling", Progress in Materials Science, vol. 51, No. 1, Jul. 6, 2005, 1-60.

Yu, et al., "Enhanced Interphase Between Epoxy Matrix and Carbon Fiber with Carbon Nanotube-Modified Silane Coating", Composites Science and Technology, vol. 99, May 23, 2014, 131-140.

(56) References Cited

OTHER PUBLICATIONS

Zhang, et al., "Highly Crystallized Poly (Lactic Acid) Under High Pressure", AIP Advances, vol. 2, No. 4, Nov. 21, 2012, 042159-1-042159-5.

Zweben, "Advances in Composite Materials for Thermal Management in Electronic Packaging", JOM: The Journal of the Minerals Metals and Materials Society, vol. 50, No. 6, Jun. 1998, 47-51.

* cited by examiner

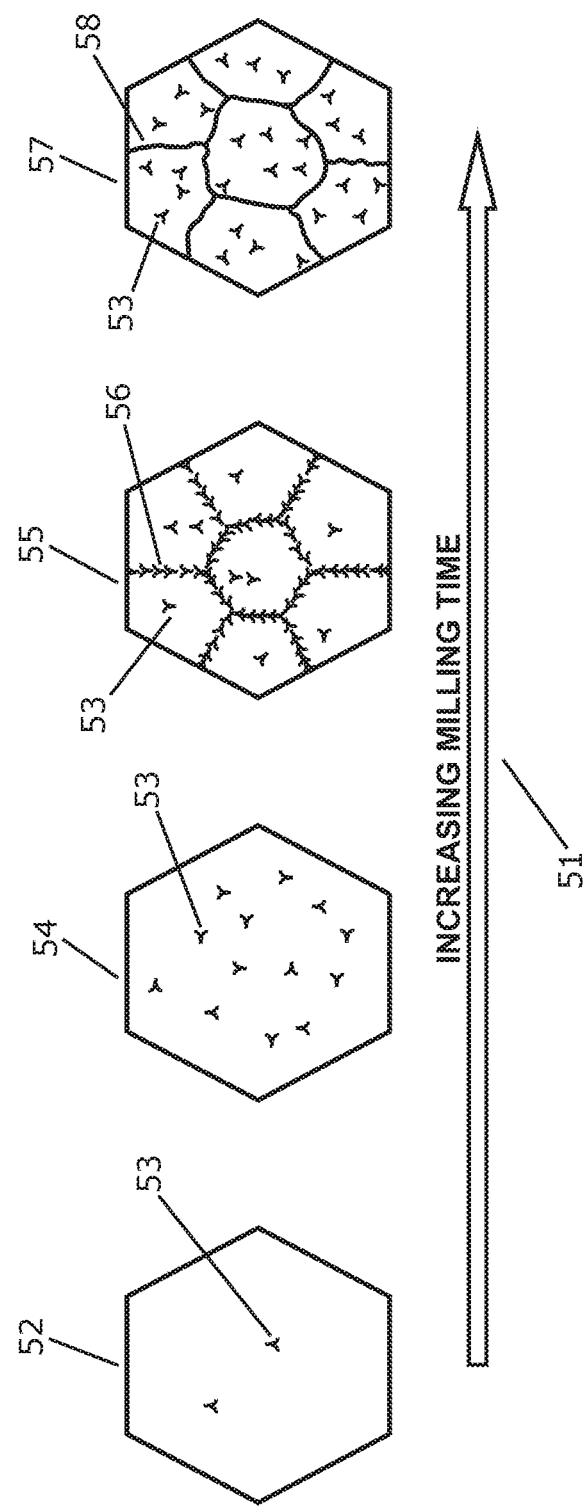

NANOCOMPOSITE HEMP

PRIORITY CLAIM

This application claims the benefit of U.S. Provisional Application No. 62/663,674, filed Apr. 27, 2018, the contents of which are incorporated herein by reference in their entirety.

FIELD OF INVENTION

The present application is generally related to composite materials comprising a cellulosic material and a polymer, wherein the cellulosic material is preferably generated from hemp plants.

BACKGROUND

Sustainably reinforced polymers are of interest in numerous industries ranging from industrial, automobile, medical, and other applications. These reinforced materials often have superior strength-to-weight and stiffness-to-weight ratios and have a wide range of physical, thermal, and electrical characteristics that make them ideal for product creation.

Composite thermoplastics can offer increased strength, decreased density and numerous other beneficial characteristics over traditional plastics. Companies are searching for biodegradable polymers and composites because they are becoming more aware of environmental and waste management issues, decreasing fossil fuel resources, and rising oil prices (Bergert 2011). The design and production of sustainable composite materials is occurring in industries ranging from the construction industry to the packing industry. Being more ecofriendly is also becoming an important requirement for consumers. In addition, alternative renewable carbon sources are being explored to promote the eco-friendly trend in addition to finding any superior properties of the alternative carbon sources.

The inclusion of certain types of nanoparticles in polymer composites, in addition to altering mechanical and physical properties, can also cause the composites to be conductive or capacitive in nature, or enhance a polymer's natural conductivity (Lu and Xu 1997; Gao et al. 2010; Jiang et al. 2006; Yan and Jeong 2017). This technological advance in polymer chemistry has inspired significant research into energy storage and energy management applications. The inclusion of carbon-based fillers, such as graphene (Potts et al. 2011; Kim et al. 2011) and carbon nanotubes (CNT) (Ma et al. 2010; Manchado et al. 2005; Coleman, Khan, and Gun'ko 2006) have been shown to improve the mechanical, thermal, and electrical properties of polymer composites. Flexible polymer composites with a high dielectric permittivity (high-k values) have attracted attention for their possible applications in high-performance electronics, wearable devices, and smart fabrics. An increase in the dielectric permittivity leads to larger energy densities which can be utilized for energy storage (Bikky et al., 2010).

Hemp has a long history of industrial use and was widely cultivated in the world for its rough use for the fiber portion of the plant. Hemp has many advantages over other agricultural crops, namely, the plant itself is resilient to weeds, it can be harvested 2-3 times a year and it does not need pesticides or herbicides to flourish. Its deep root system means that hemp plants need much less nitrogen (fertilizer) and water to flourish compared to other crops like cotton. Moreover, farmers can use hemp plants as an alternative to clear fields for other crops. For example, the average hemp plant grows to a height of between six (6) feet to sixteen (16) feet and matures in approximately seventy (70) to one hundred ten (110) days, thus facilitating multiple harvest opportunities each year in many areas of the world. A hemp crop has the potential of yielding 3-8 tons of dry stalks per acre per harvest while remaining carbon negative.

Hemp, like many dicotyledonous plants, contains a phloem (hurd) and fibers (bast fibers) around the phloem. Inside the bast fiber is the hurd, a wood-like portion of the hemp plant, which surrounds a hollow core. In any given hemp plant, there is significantly more hurd biomass than of fibers. Unfortunately, the use of the hurd has been shunned to date, even though it is the primary biomass of the plant. Manipulation and use of the hurd, therefore, would serve as a critical step in use of this cellulosic product that would otherwise become waste.

Fibers have been frequently utilized individually, which requires that the fibers are separated from the hurd by mechanical (for example, decortication), or chemical properties, and the fibers can then be used for any fiber materials, including textiles like carpet, yarn, rope, netting, matting, and the like, but hurd has low use throughout the world.

Widespread use of *cannabis* was dramatically reduced during the 20$^{th}$ century due to the concern regarding the amounts of tetrahydro cannabinoids (THC) within the plants. However, there are a number of different strains/cultivars of the hemp plant that contain smaller and larger amounts of the psychoactive compound, THC, and thus cultivation can be optimized for the particular growth and THC content that is desired, including plants with low to zero THC. Here, a fast growth rate and a high total biomass is desired, although any biomass may be suitable for use. These traits may be naturally derived through strains and cross-breeding as known to those of ordinary skill in the art, or genetically modified Ultimately, hemp functions as a carbon negative plant, making it highly attractive for large scale use, especially where a downstream use can be identified. These features make hemp an intriguing option for cultivation, but the many difficulties with the plant have precluded its use on any scale up to this point.

Therefore, in an effort to pursue sustainable and environmentally responsible composite filler material, suitable for use in a variety of master batch processes, and as a replacement for the more expensive and time/process intensive CNTs (carbon nano tubule) and graphenes in any number of composite materials, applicant has identified nanoparticle hemp-based materials optimal for a feedstock for nanocomposite production. Herein, we describe materials, methods, and processes for generating novel nanocomposite materials using hemp as a nano or micro particle within a composite material.

SUMMARY OF THE INVENTION

A preferred embodiment is directed towards a composite material comprising a polymer and a hemp product, wherein the hemp product comprises between 5 and 50% of the total mass of the composite. In a preferred embodiment, the hemp product is biocharred. In a preferred embodiment, the biocharred hemp comprises an average particle size of between 0.1 and 1000 microns. In a preferred embodiment, the biocharred hemp is less than 10 microns. In a preferred embodiment, the biocharred hemp wherein 90% of the hemp is less than 2 microns in size.

In a preferred embodiment, a composite is formed wherein the hemp is cryomilled before addition to the composite material.

In a preferred embodiment, a composite is formed wherein the hemp is carbonized (biocharred) before addition to the composite material.

In a preferred embodiment, a composite is formed of the polymer and the hemp product when the hemp product and the polymer are combined into a mill a milled together, to create individual particles, each of which individual particle is itself a composite of at least the polymer and the hemp product.

A preferred embodiment is a composite material comprising electrical properties having a resistance of less than 100Ω, which is comprised of a polymer material and a carbonized hemp, wherein said composite material comprises between 10 and 50% of carbonized hemp.

A preferred embodiment is directed towards a composite material made by a process comprising: milling a portion of polymer to generate an average particle size of the polymer of no more than 100 micron, using a 30 Hz processing; processing a portion of hemp by cryomilling said hemp under liquid nitrogen for between 10 and 30 minutes at 30 Hz; and combining a portion of polymer and a portion of hemp and milling them together at 30 Hz for between 10 and 30 minutes.

In a preferred embodiment, the composite material, wherein the particle size of the polymer is between 0.1 and 100 microns. Preferably, the particle size is between 0.1 and 50 microns, and more preferably between 0.5 and 25 microns, and more preferably between 0.5 and 10 microns.

In a preferred embodiment, a method of manufacturing a composite hemp based material comprising: processing a portion of polymer to generate an average particle size of the polymer of no more than 50 microns using a 30 Hz processing; processing a portion of hemp by cryomilling said hemp under liquid nitrogen for between 10 and 30 minutes at 30 Hz; and combining a portion of polymer and a portion of hemp and milling them together at 30 Hz for between 10 and 30 minutes.

In a preferred embodiment, a method of manufacturing a composite carbonized hemp based material comprising: milling a portion of polymer to generate an average particle size of the polymer of no more than 25 microns, using a 30 Hz processing; processing a portion of hemp by charring the hemp at a temperature above 600° C. for 60 minutes and then letting said charred material return to room temperature; milling said charred hemp for between 10 and 30 minutes at 30 Hz; and combining a portion of polymer and a portion of hemp and milling them together at 30 Hz for between 10 and 30 minutes.

A preferred embodiment wherein said carbonizing process reaches a temperature of at least 600° C.

A preferred embodiment wherein said carbonizing process reaches a temperature of at least 900° C.

A preferred embodiment wherein said carbonizing process reaches a temperature of at least 1100° C.

In further preferred embodiments, the composite materials comprising at least 10% of carbonized hemp, wherein said carbonized hemp is milled to an average particle size of less than 10 microns, with at least 90% of the particles having a size of less than 25 microns. In further preferred embodiments, the composite material comprises at least 15% of carbonize hemp. In further preferred embodiments, the composite material comprising at least 10% of carbonized hemp, wherein said carbonized hemp is milled to an average particle size of less than 5 microns, with at least 90% of the particles having a size of less than 10 microns.

In a preferred embodiment, the composite material comprising a polymer and a carbonized hemp filler, wherein the carbonized hemp filler is produced by carbonizing hemp at a temperature of at least 1100° C. to produce a char; and milling the char to produce a particle size, wherein the filler comprises 95% of particles of less than 10 microns in size; and wherein the hemp filler comprises between 1 and 50% of the total mass of the composite.

In a preferred embodiment, the composite wherein the hemp particle filler comprises an average particle size of between 0.1 and 10 microns.

In a preferred embodiment, the composite wherein the hemp particle filler comprises an average particle size of less than 2 microns.

In a preferred embodiment, the composite wherein the milling process comprises a cryomilling process.

In a preferred embodiment, the composite wherein the hemp filler and the polymer are milled together forming individual particles that are themselves composites of the polymer and hemp filler.

In a preferred embodiment, the composite wherein the hemp filler is included at a sufficient density in the composite wherein the resistance of the composite is less than 100Ω.

In a preferred embodiment, in the formation of a composite, no silanes or other dispersing agents are utilized to disperse the hemp particles into the polymer to form the composite materials.

In a preferred embodiment, a composite material comprising a polymer and a hemp char filler, wherein the hemp char filler is produced by carbonizing a portion of hemp at a temperature of at least 1100° C. to produce a hemp char; and milling the hemp char to produce the hemp char filler having an average particle size of less than 10 microns; adding into hemp char filler a portion of polymer and milling the hemp char filler and polymer together to form the composite material, wherein the hemp char filler comprises 95% of particles of less than 10 microns in size; and wherein the hemp char filler comprises between 1% and 50% of the total mass of the composite material.

In a further preferred embodiment, the composite material wherein the hemp particle filler comprises an average particle size of less than 2 microns.

In a further preferred embodiment, the composite material wherein the milling comprises a cryomilling process.

In a further preferred embodiment, the composite material wherein the hemp char filler is included at a sufficient density in the composite material wherein the resistance of the composite is less than 100Ω.

In a further preferred embodiment, the composite material wherein the composite does not contain silanes or a dispersing agent to disperse the hemp particles into the polymer before forming the composite material.

In a further preferred embodiment, the composite material wherein the composite material is extruded into a composite article.

In a further embodiment, a composite material made by a process comprising: processing a portion of polymer to generate a polymer particle having an average particle size of no more than 100 micron, using a 30 Hz processing in an oscillating mill; processing a portion of hemp for between 10 and 30 minutes at 30 Hz to generate a hemp particle; and combining a portion of polymer particle and a portion of hemp particle and milling them together at 30 Hz for between 1 and 30 minutes.

In a preferred embodiment, the composite material formed by a process, wherein the portion of hemp is processed by croymilling the hemp under liquid nitrogen.

In a preferred embodiment, the composite material formed by a process, wherein the average particle size of the polymer and of the hemp particle are each less than 10 microns.

In a preferred embodiment, the composite material formed by a process, wherein the polymer is acrylonitrile butadiene styrene, polylactic Acid, polyethylene terephthalate, polypropylene, or combinations thereof.

In a preferred embodiment, the composite material formed by a process, wherein the particle size of the hemp particle is an average of less than 2 microns.

In a preferred embodiment, the composite material formed by a process, comprising a further step wherein the portion of hemp in step (ii) is carbonized hemp. In a further embodiment, the process wherein the carbonized hemp is made by heating a portion of hemp in a furnace at a temperate of greater than 600° C.; and wherein an inert gas is added to the furnace to create a low oxygen environment within the furnace while heating the hemp. In a further embodiment, the process wherein the carbonized hemp is heated at a temperate of greater than 1100° C.

In a preferred embodiment, the composite material formed by a process, wherein the hemp is selected from: hemp stalk, hemp hurd, hemp fiber, hemp leaves, and combinations thereof.

In a preferred embodiment, a method of manufacturing a hemp based composite particles comprising: processing a portion of polymer to generate a polymer particle having an average particle size of no more than 10 microns, using a 30 Hz processing in an oscillating mill; processing a portion of hemp by cryomilling said hemp under liquid nitrogen for at least 10 minutes at 30 Hz; and combining a portion of the no more than 10 microns polymer and a portion of the cryomilled hemp and milling them together at 30 Hz for at least 1 minute to form composite particles.

In a further embodiment, the method wherein the composite particles are further processed by extrusion or molding to form a composite article.

In a further embodiment, the method wherein the average particle size of the polymer particle is no more than 2 microns.

In a further embodiment, the method wherein the average particle size of the cryomilled hemp is no more than 2 microns.

In a further embodiment, the method wherein a composite particle comprises between 1 and 50% of the cryomilled hemp. In a further embodiment, the method wherein the composite material has a resistance of less than 100Ω.

In a further embodiment, the method wherein the polymer is selected from a biodegradable polymer, a non-biodegradable polymer, or combinations thereof.

In a further embodiment, the method wherein the portion of hemp is a carbonized hemp. In a further embodiment, the method wherein the carbonized hemp is charred at a temperature of greater than 600° C. under an inert gas.

In a further embodiment, the method wherein the polymer is acrylonitrile butadiene styrene, polylactic acid, polyethylene terephthalate, polypropylene, or combinations thereof.

In a further preferred embodiment, a composite material comprising electrical properties, comprised of a polymer material and a carbonized hemp, wherein said composite material comprises between 5 and 50% of carbonized hemp.

In a further embodiment, the composite material comprising at least 10% of carbonized hemp, wherein said carbonized hemp is milled to an average particle size of less than 5 microns, with at least 90% of the particles having a size of less than 2 microns.

In a further embodiment, the composite material comprising at least 15% of carbonize hemp.

In a further embodiment, the composite material comprising at least 10% of carbonized hemp, wherein said carbonized hemp is milled to an average particle size of less than 2 microns, with at least 90% of the particles having a size of less than 2 microns.

In a further embodiment, the composite material comprising at least 10% of carbonized hemp, wherein said carbonized hemp comprises an average particle size of less than 2 microns and wherein 95% of all hemp particles are less than 2 microns in size; and wherein the polymer material is admixed with the carbonized hemp and milled together to form a composite particle, and wherein the composite particles are extruded or molded to form a composite article.

BRIEF DESCRIPTION OF THE DRAWINGS

FIG. 3 depicts an increase in fractures based upon milling time.

DETAILED DESCRIPTION OF THE EMBODIMENTS

Figure 1:
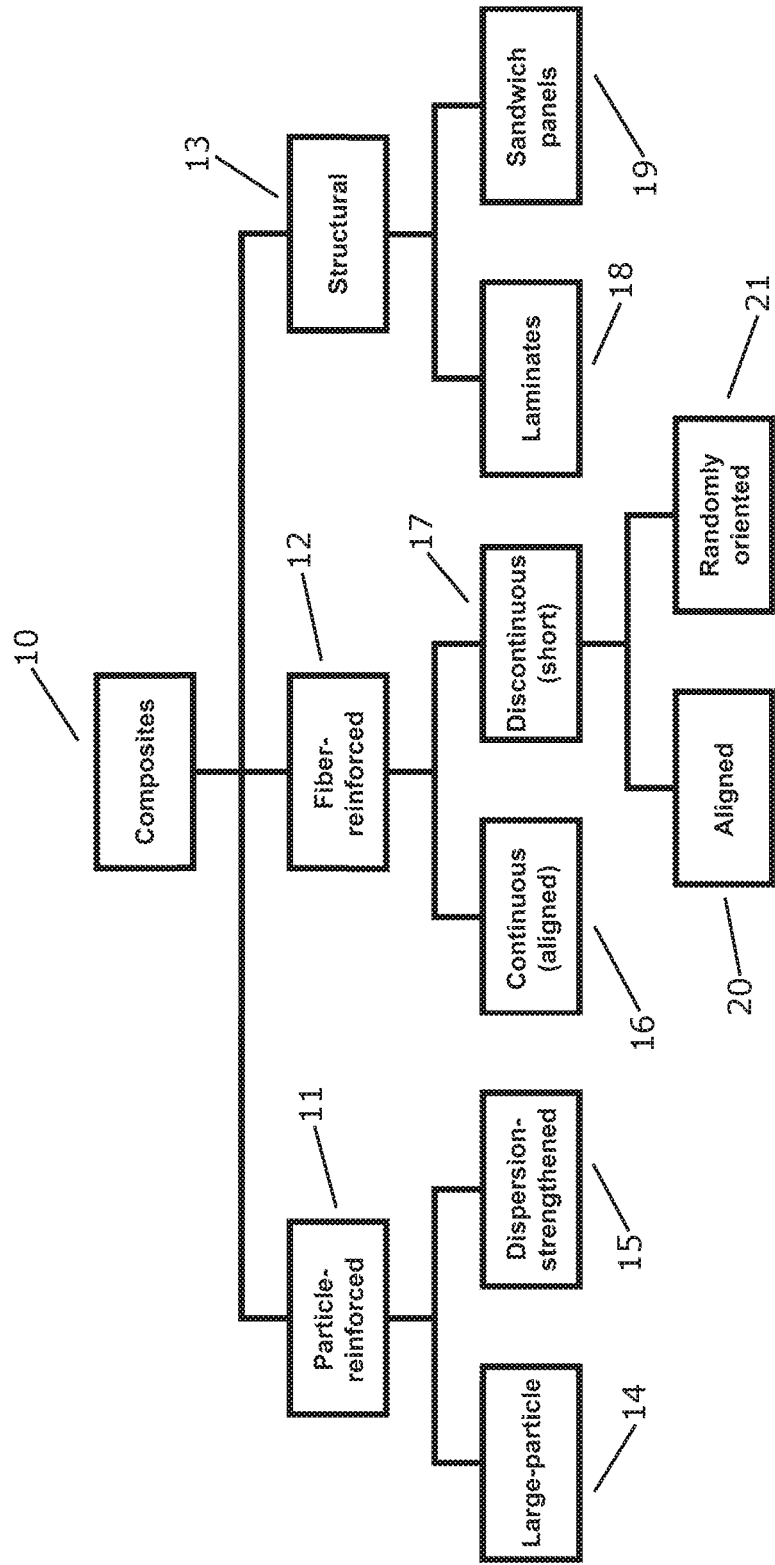
FIG. 1 depicts a graphical representation of different composite families.

Inclusion of hemp-derived nanofillers into a biodegradable polymer matrix represents an understudied sustainable/biodegradable nanocomposite. There is limited research on hemp-derived biodegradable nanocomposites due to the lack of a hemp industry in the United States. The Marijuana Tax Act of 1937 placed taxes, penalties and enforcement provisions on the sale of *cannabis*, hemp, or marijuana. This act placed industrial hemp on the controlled substance list and made it illegal to grow. However, on the federal level, the 2014 Farm Bill that was passed now allows universities and state departments of agriculture to grow industrial hemp for research purposes. In addition, the Industrial Hemp Farming Act of 2018 was introduced to remove industrial hemp from the controlled substance list as long as it contains less than 0.3% Tetrahydrocannabinol (THC). However, some state laws still do not allow the cultivation of industrial hemp (National Conference of State Legislation).

The conclusions drawn during this disclosure detail improved physical properties, which surprisingly exceed expected properties for composite formation. Furthermore, the stiffness of tested composites increased with the increase of biochar content. In addition to the increase in stiffness, the increase of biochar content decreased the peak degradation temperature, glass transition temperature, crystallization temperature, and melting temperature.

The use of hemp as compared to other cellulosic materials provides for a sustainable composite material. As an alternative to wood pulp, hemp grows faster and may be able to be grown in areas that are not hospitable to trees, making it suitable for local growth and use, despite soil conditions. Indeed, a significant benefit to such growth is the local propagation of these cellulosic sources, rather than import tree pulp, thereby reducing the energy expenditure and costs associated with shipping raw or finished products far from their ultimate consumption location. For example, hemp grows in inhospitable areas, is resilient to weed ingrowth, does not require the use of pesticides or herbicides and requires little fertilizer or water to thrive, thus allowing widespread cultivation despite soil and temperature conditions. Hemp can also be utilized to assist in clearing or resting a field, between higher energy/nutrient uptake crops, such as soy and corn. Ultimately, hemp functions as a carbon negative plant, making it highly attractive for use.

Indeed, hemp provides for a unique building material, as it is easily grown and grows at a high density, as compared to typical wood pulp sources such as with timber. However, the hurd is a fibrous, cellulosic material that is difficult to use in certain commercial applications. In order to optimize the use of this material as a composite, it needs to be reduced down to extremely small sizes. Absent reduction to such small particles, the material is not as useful for the materials and processes described herein. Herein, is advantageously described methods for milling hemp, and for milling hemp together with a polymer for formation of nano composite materials having improved properties.

Materials used in industrial and commercial products are selected based on the performance criteria necessary for their end use. For example, ceramic is a common material used for most mugs to keep a hot beverage warm. Ceramic is a very porous material, which acts as an insulator for the beverage (McGuire 2002). A bicycle needs to be lightweight and safe. Steel is a very durable and cheap metal, but it is not a suitable material choice for adult bicycle fabrication because it is very heavy. Bicycle companies, like Trek, make most of their frames out of aluminum. Other companies, such as Zipp, use carbon fiber to construct carbon fiber composite frames. Carbon fiber is utilized for its ultra-lightweight, high strength properties, which results in a high-performance bike with superior weight to strength properties. Carbon fiber bikes could cost over a thousand dollars, but they will last a lot longer than a kid's bike that is made out of steel and only costs a few hundred dollars.

Depending on the application, a current material's properties may need to be altered or a completely new material may need to be created in order to sufficiently perform in a specific application. With advances in materials science and nanotechnology, mechanical, electrical, and physical properties of materials can now be readily manipulated and optimized.

A material can be reinforced with another secondary material to make a composite and achieve and/or enhance necessary properties. A composite is made up of two parts: the matrix and the reinforcement (fillers, fibers, woven fabric, etc.). The matrix is usually a resin that binds (with intermolecular attractive forces, chemical bonding, etc.) to the second component to keep them connected. The filler acts as a reinforcing component to the matrix, giving it a new and/or improved property such as stiffness and strength. A common example of a composite is concrete. Concrete is made up of sand, gravel and cement, which is mixed together to form one solid material (Callister and Rethwisch 2013). There are different types of composites that are shown in the tree diagram in FIG. 1, which details a composite 10 tree comprising particle-reinforced composites 11, fiber-reinforced 12, and structural 13 composites. Particle reinforced 11 include large-particle 14, and dispersion-strengthened 15, fiber reinforced 12 include continuous 16, and discontinuous 17, and a subset of aligned 20 and randomly oriented 21 fibers. While Structural 13 includes laminates 18 and sandwich panels 19. This work is focused on particle reinforced composites, in particular those that utilize a biodegradable source from hemp, and thus allows for formation of particle-reinforced composites that may incorporate biodegradable properties, based upon the election of the polymers for use in the composite.

The nano-sized fillers in the composite materials have a higher surface to volume ratio compared to micron-sized fillers. Each particle generated by the embodiments herein is itself a composite of nano and micron sized polymers and hemp. Having an increased surface area allows the nano-sized fillers to interact with the polymers surrounding them. Nanocomposites are beneficial because of their ability to improve some properties by the interaction with polymers at a nano-scaled level. A higher aspect ratio also allows for a small amount of nano-scale material to have a greater effect on the overall properties of the material as a whole. Polymer nanocomposites have demonstrated an increase in modulus and strength, improved resistance to heat, and decreased flammability. Furthermore, the nano-sized fillers in the nanocomposite are more effective at improving properties at lower loadings than composites with micron-sized fillers (Potts et al. 2011). Potts work demonstrates the benefit of nano-sized fillers compared to micron-sized fillers.

Potts et al. (2011) explains how polymers interact with different sized fillers based on volume fraction. Other researchers found that if 1 vol % of a nanoparticle with a radius of approximately 2 nm and 1 vol % of a nanoparticle with a radius of approximately 20 nm was mixed with a polymer, the volume fraction of the polymer interfacing with the nanoparticles is ~63 vol % and ~1.2 vol %, respectively (Winey and Vaia 2007). Changing the size of the filler particles results in a change of interaction between the polymers and particles. Often having less filler is beneficial because it lowers the overall weight and cost of the composite as well as the labor of making the composite (Potts et al. 2011).

Nanocarbon Fillers

Carbon nanotubes (CNTs) can be used to reinforce a matrix to enhance the mechanical properties of the composite. CNTs also have better electrical and thermal properties compared to other carbon materials. Applications of CNTS include conducting composites, energy storage, conductive adhesives, etc. The most common problem with CNTs is that they do not disperse well; instead they agglomerate and entangle with one another when mixing. Also, the CNTs have low interfacial adhesion to some polymer matrices used. These problems are enhanced by the CNTs having a large surface area due to their small diameter and high aspect ratio (Ma et al. 2010). Advantageously, the benefits of the hemp-based particles is that we do not need to utilize or rely upon silanes or other dispersing agents to form the composite materials.

Benefits of Nanocomposites

Various properties of the material could change when using nanofiller to reinforce a polymer. Some of the properties include physical, mechanical, electrical and thermal. In this research, the mechanical and electrical properties were examined.

Mechanical Properties

Mechanical properties of materials can include the modulus, tensile strength, ductility, hardness, impact resistance, etc. These properties are determined by applying forces to the material and studying the reactions. particles, specifically carbon particles are used for reinforcement because of their size. The particles are inserted themselves at the interface of the matrix and absorb some of the stress transfer. Within the composite, the polymer chains become stiff because they are constrained by the nano reinforcements and cannot stretch out. By capturing some of the stress and stiffening of the polymer, the carbon fillers can improve the mechanical properties of the composite. Interestingly, when comparing CNT and CNP both enhanced the tensile strength at lower weight percentages of 1% and 2%, respectfully. However, when the weight percent increased to 5-15%, a decrease in tensile strength was observed. The decrease was due to less filler to polymer contacts and interactions in the composite (Aljaafari et al. 2011). In addition, the Young's modulus increased by 200% with only 1% of CNT and increased only 37% with 2% of CNP. The difference between the CNT and CNP is the aspect ratio of the CNT is greater. The polymer chains entangle around the length of the tubes, which strengthens the composite. Whereas the CNPs become folded around the polymer chains and agglomerate together (Aljaafari et al. 2011). Aljaafari's work concludes that both nano-carbon reinforcements enhance the mechanical properties of the composite but at different filler loadings, depending on the shape of the reinforcement.

Electrical Properties

The percolation threshold is defined as the minimum volume content of filler at which a continuous network is formed (Kalaitzidou et al. 2010). The percolation threshold is important to consider when creating a conductive polymer because it determines the amount of filler needed to form a conductive network throughout the polymer composite. Some of the factors to consider when determining the percolation threshold include: the conductivity of the materials, the volume fraction and the filler characteristics (size, shape, surface area, etc.) (Kalaitzidou et al. 2010). Each of these factors should be analyzed when attempting to determine the percolation threshold.

In a study on electrical conductivity and percolation threshold, Kalaitzidou and others found that spherical shaped particles made it more difficult to form a network because the particles became agglomerated. Non-spherical particles (fibers and platelets) have larger aspect ratios so they can create a network at lower loadings (Kalaitzidou et al. 2010). In this case, the particle shape influenced conductivity of the composite.

Additional studies with polymer composites with finite element models determined when the composite filler is spherical, the increase in permittivity is small. When the filler has a high aspect ratio, the permittivity increases more with increased loading (Z. Wang et al. 2013). Note that the high aspect ratio is important when trying to increase the permittivity of a polymer.

Production of Nanocomposites

Nanocomposites can be created in a variety of ways that can involve mechanical milling (ex situ) or more complex processes that use chemicals and reactants (in situ). Examples of mechanical milling include planetary mills, ball mills, mixer mill, attritor mills and pan and rod mills. All mechanical milling has advantages and disadvantages to take into consideration when choosing the type of milling for a material. In some mechanical milling processes, the materials may be exposed to extreme temperatures and aggressive stirring. The conditions may degrade the material and potentially alter the performance of the material. Some of the advantages of mechanical milling include the reduced cost and absence of additional chemicals needed to disperse fillers (Delogu et al. 2017). This is especially true here, where the sustainability of the material is import, and thus chemical milling is disadvantageous.

Cryomilling

Cryogenic mechanical alloying, or cryomilling, is a mechanical process in which materials are transformed into micron and smaller-sized particles via milling at reduced temperatures. The process involves putting a material in a jar (typically stainless steel) with stainless steel milling balls. The jar contents are then cooled with liquid nitrogen, resulting in temperatures below −180 C, and nearing the −196 temperature of liquid nitrogen. The jar is shaken at a set frequency and time. There are two types of cryogenic mechanical alloying. The first type introduces the cryogenic liquid directly to the material during the milling process. The second type introduces the cryogenic liquid to the exterior of the jar to induce cooling but never comes into direct contact with the material (Witkin and Lavernia 2006). In this work, the latter technique was used. Cryomilling is unique because the material being milled becomes very brittle due to the low temperatures the cryogenic liquid presents to the environment and the hemp reaches a brittle-to-ductile transition temperature which increases the risk of brittle fracture. Thus, when milled, the hemp fractures at a greater rate thus reducing the particle size of the material.

When the jar is shaken, the brittle material is sandwiched between the balls and sides of the jar. Furthermore. when this action happens, the material collides with other particles and forms a layered structure on the micron to nano scale. The brittle material breaks down in a patterned way. For example, the way nanotubes break is in a crystalline cut (Azeez et al. 2013). Witkin describes the final nanocrystalline structure as having grain refinement in a three-stage process (FIG. 3). Initially, the structure 52 has few deformations 53. As the milling process proceeds, the structure 54 has more small, localized deformations 53. As the process continues, the small deformations 53 expand throughout 56 the structure 55. Ultimately, the deformations 58 are randomly oriented throughout the whole composite 57 (Witkin and Lavernia 2006). Hence, when one particle gets crushed into another, the particles combine and become a newly structured composite particle. When the shaking of the jar is repeated, many particles are fused together forming a composite like structure.

Many parameters can be changed in the cryomilling process and determine the final microstructure of the material. These parameters include:
Duration of milling time
Frequency of shaking the jar
Number of balls
Size of balls
Mass of materials being milled
Number of times the material is cryomilled With regard to multi-walled carbon nanotubes (MWCNTs), changing the milling speed of rotary mills (300 rpm and 700 rpm) and the milling time (2 hours and 6 hours) modified the structures, whereas higher milling speeds reduced the agglomeration of the MWCNTs and shortened the lengths. However, higher milling speeds decreased the polycrystalline structures of the MWCNTs. The milling time did not impact the structure or dispersion of the MWCNTs. In regard to the hydrogen storage, cryomilling benefits the MWCNTs because it increased the surface area and pore volume. Increasing the surface area would also allow for a filler to come into contact with the polymer chains more frequent which may result in a better mechanical strength.

With regard to the thermal and conductive properties of a CNT and poly(methyl methacrylate) (PMMA) composite while varying the duration and frequency parameters of cryomilling. the increased time and frequency of cryomilling was found to allow for better dispersion which resulted in a lower resistivity, or high conductivity, overall. However, it was found that the surface resistivity increased at the highest frequency of 25 Hz (using an oscillatory mill). The increase in resistivity is due to the lower aspect ratio of the particles caused by the deformations at the higher frequency. In addition, the resistivity increased at the longest duration (15 minutes) of cryomilling time. Due to the longer amount of time that the material was exposed to the conditions of the cryomill, the aspect ratio of the CNTs decreased. In both of the conditions, a continuous conductive network could not be formed, which lowered the conductivity (Mittal et al. 2016). Time and frequency are just two of the cryomill parameters that may change depending on the material being used.

Material requirements and performance expectations for a material or product should be considered when making selections for an application. Some concerns could include weather conditions a material must withstand, performance under tensile and/or compressive loads, biodegradability, flexibility, etc. Many materials may need to be explored and tested before choosing the best-fit material for the application. Alternative materials are always being researched to make a product cheaper, have better quality and/or be eco-friendly. For example, natural fibers are being considered more often as a reinforcing element of a composite. Natural fibers can be obtained from a renewable resource and can have preferable characteristics like biodegradability, low density and specific mechanical properties that other fibers do not have (Panaitescu et al. 2014). Also due to their cellular structure, natural fibers exhibit thermal insulating properties, which would be beneficial for enhancing thermal and acoustic properties in a composite (Sassoni et al. 2014). Hemp as a nanoparticle portion of a composite is unique in several ways, which leads to certain unexpected properties of the resulting composite.

Accordingly, in the processes and embodiments herein, an optimal range of milling is between 20-50 Hz, with a most preferred range between 25 and 40 Hz, and preferably 30 Hz. Furthermore, milling time is preferably between 10 minutes and 24 hours. Preferably, a polymer is milled at about 30 Hz for about 30 minutes, and a hemp material is further milled at 30 Hz for about 30 minutes and finally, a composite is formed by milling a combination of previously milled hemp and polymer at 30 hz for about 1 to 30 minutes. This results in the formation of individual composite materials of hemp and polymer, each particle comprising a plurality of polymer and hemp particles.

Hemp Based Composite Materials

Figure 2A:
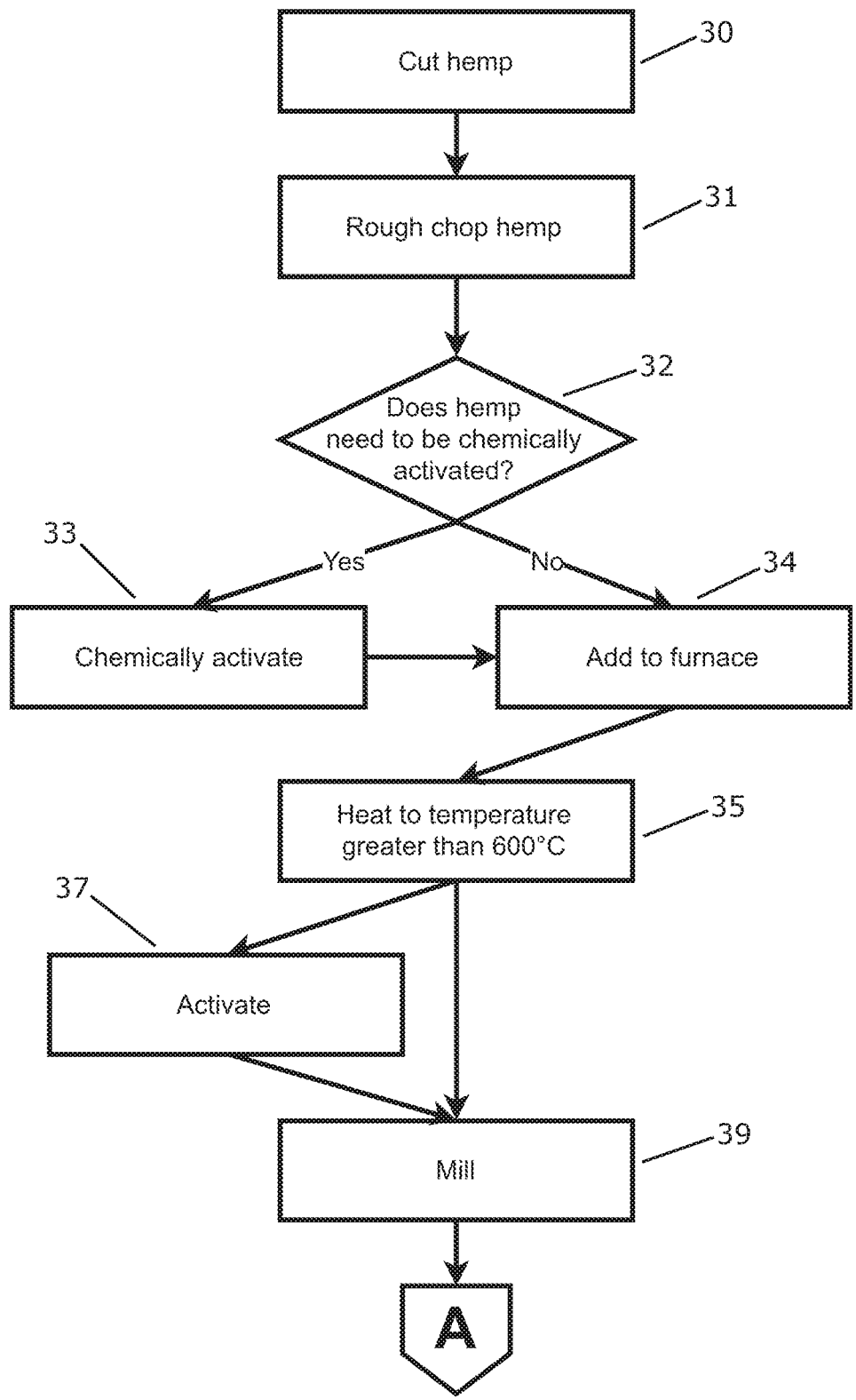
FIGS. 2A and 2B depict a flowchart of an embodiment of a process of forming a composite.
Figure 2B:
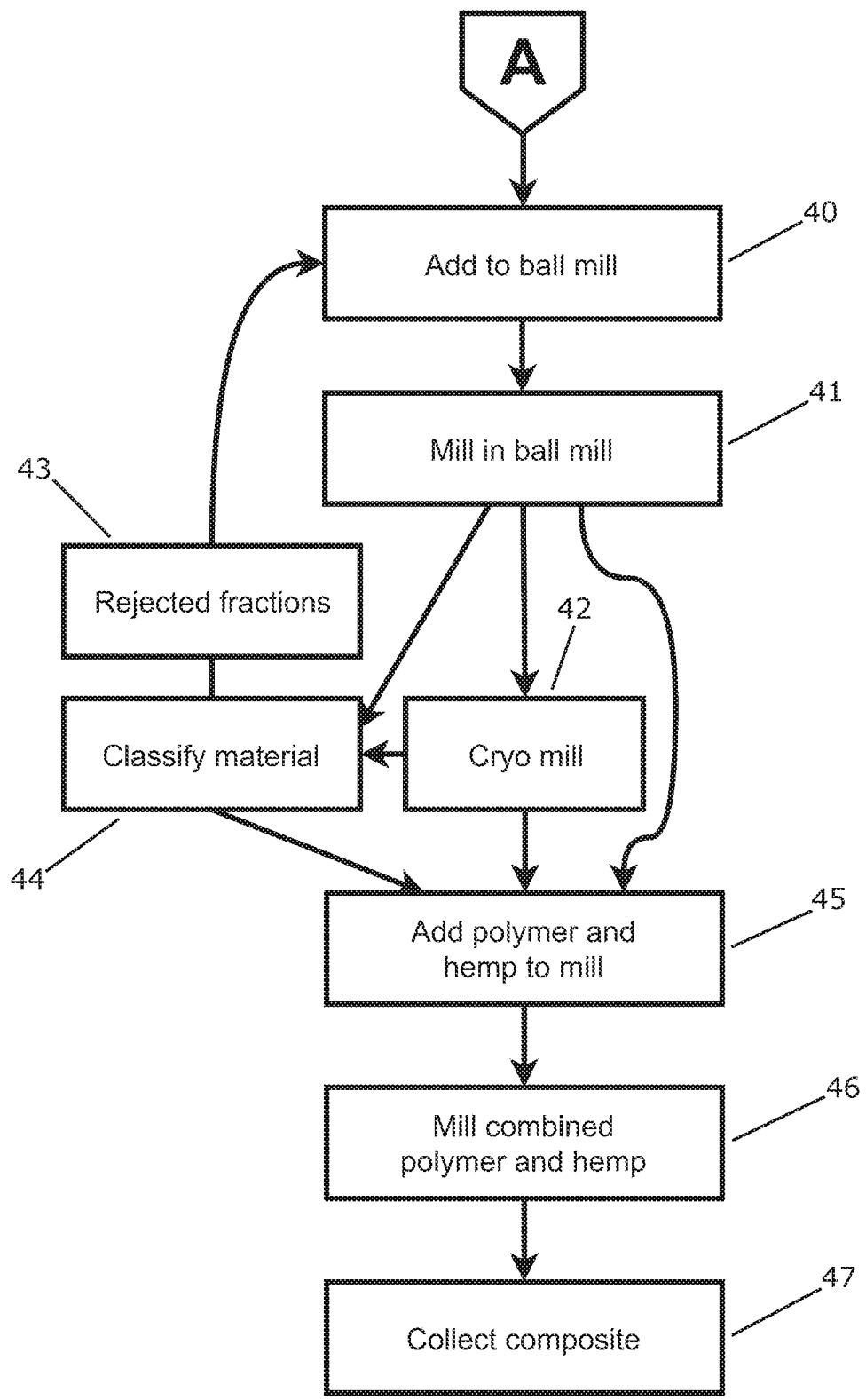

Hemp can be advantageously milled into a fine powder, and based upon different protocols, the hemp particle size can be modified from between 0.001 microns to hundreds of microns. For the nano composites defined herein, the focus is on generating composite particles below 100 microns and preferably below 50, below 20, below 10 microns, below 5 microns, below 2 microns, and below 1 micron. For each of these particle sizes, a milling process and a classification system of the hemp and or polymer, such as detailed in FIGS. 2A and 2B is easily utilized to create more homogeneous mixtures of hemp or polymer particles, and the average particle size, for example with a 50 micron classification screen includes 90% of particles between 2 and 50 microns in size. In preferred embodiments, the average particle size is between 5 and 100 microns, with a range of between 5 microns and 200 microns. The most preferred embodiments use an average particle size of less than 20 microns and with 75%, or 90, or 95 or 99% of all particles having a size of less than 20 microns, and preferably less than 10, less than 5, and less than 2 microns. Use of classification systems can be advantageous in separating the milled material to obtain materials having a similar size, to create a more homogeneous material, which can then generate a composite having hemp and polymer particles of a similar size.

The typical composite formation includes a carrier material and the filler, which can be mixed together in a number of ways. However, the embodiments herein describe formation of a polymer material with a fraction of hemp-based material. In certain embodiments, the polymer comprises a biodegradable polymer, such as PLA (polylactic acid), in which a composite comprising hemp particles is biodegradable. In other embodiments, the polymer is poorly or non-biodegradable polymer, such as polypropylene. Additionally, composites may be formed of two or more polymers, wherein the combination may include properties of each of the combination of polymers. For example, a composite comprising PLA and polypropylene will be more biodegradable than polypropylene alone but will be reduced as compared to PLA alone.

To form the composite material, it is preferable to mill a fraction of the hemp material, and then re-mill the hemp with the polymer material. For example, the composition may comprise between 1% to 99% cellulosic material (hemp), and between 99% and 1% of a polymer, or mixture of polymers. Each of the hemp particles and the polymer are combined into a mill and then milled together. This allows the particles to combine together so that particles are formed, each particle, itself being a polymer.

Preparation of Nanocomposite Powder Via Cryomilling:

Composite materials, by their very nature, use at least a first and second component to make up a new material. Hemp can serve as a suitable component for one of the two materials for a simple composite and that a polymer is the second material. A first polymer material is added to a portion of a hemp product. In the nanocomposites, the hemp serves as reinforcement for the polymer matrix. Polylactic acid (PLA), acrylonitrile butadiene styrene (ABS) and Polyethylene terephthalate (PET), among other thermoplastics are all viable matrices/first polymer material for nanocomposite production. In our testing, we recognized that formation of composites was impacted by reduction in the particle size of the hemp products. In a first embodiment, we utilized cryogenic milling strategies to generate hemp particles of several micron and smaller size for composite formation.

Cryogenic mechanical alloying (CMA, or cryomilling) occurs at temperatures low enough (i.e. liquid nitrogen, −196° C.) to limit polymer chain mobility and allow for solid-phase mixing of polymer and filler to occur on the nanoscale. Essentially, this process generates brittle materials, which, when combined with the mechanical properties of the milling components (e.g. metallic balls), masticates the polymer or hemp material into particles having an average size that is much smaller than if the material was simply masticated at room temperature. Indeed, the use of CMA to mill polymer or hemp, or carbonized hemp results in nanoscale particles and filler dimensions and homogeneous dispersion within the nanocomposites. This processing step is a novel approach to nanocomposite production. The inclusion of filler material in the solid state will result in a product that is physically well dispersed, providing the resulting material with distinct mechanical, thermal, and electrical (in the case of carbonized hemp) properties. The specifics of this cryomilling process are as follows:

1. Depending on polymer matrix, 4 to 6 grams of neat polymer is placed in a 50 mL stainless steel grinding jar.
2. Three 15 mm diameter stainless steel grinding balls are added to the grinding jar and the jar is oscillated at 30 Hz for 15 minutes to ensure all polymer is milled to micron-range particle size, while the jar is incubated in liquid nitrogen (for cryomilling procedures).
3. Hemp is cryomilled following a similar methodology. The grinding jar is filled with 4 to 6 grams of hemp material (hurd, or hemp stock comprising both hurd and fibers) (pre-processed into pieces 20 mm in length by 5 mm in diameter) and three 15 mm grinding balls and oscillated at 30 Hz for 10 minutes. Longer milling times did not result in improved powder formation. Three grinding balls resulted in improved powder formation over one or two grinding balls. It was found that 30 Hz is optimal for ensuring homogenous micron to sub-micron particle size. Larger masses can be utilized and the process upscaled for larger quantities of material to be ground, as understood by one of ordinary skill in the art.
4. Once cryomilled powder of the polymer matrix and the hurd filler are prepared, mixtures ranging from 0.5 to 50% by volume were cryomilled together to create nanocomposites with varying mechanical and electrical properties. Appropriate masses of both hurd powder and polymer powder (totaling 5 g) were placed in the grinding jar with three 15 mm diameter grinding balls and oscillated at 30 Hz for 15 minutes.

Carbonized Nanocomposite Formation

The process above for hemp particle formation was generally followed, with some slight modifications. Prior to the cryomilling step, hemp stock material was placed in a tube furnace under constant nitrogen flow and heated at 6° C./min to a minimum temperature of 600° C. The hemp was held above this minimum temperature for 60 minutes and then cooled at an uncontrolled rate until it reached room temperature. The carbonized hemp was tested for resistivity and, for materials desiring conductivity, only material with resistivity values less than 100Ω were included in the nanocomposites.

Carbonized hemp did not need to be cryomilled independent of the polymer powder, due to the mechanical fragility of the carbon material. Accordingly, where carbonized hemp is utilized, a standard milling process, either wet milling (using an aqueous or non-aqueous solvent) or a dry milling process can be used, without the need for the cryo process. Monolith pieces of carbonized hemp were placed directly in the mill jar with the polymer and oscillated at 30 Hz for 15 minutes to produce the carbon nanocomposite power. However, the above process where the hemp is first milled and then combined with the polymer can also be followed, and milling of the carbonized hemp resulted in a reduction of the average particle size, as compared to simply milling the monolith pieces with polymer. The polymer can be cryomilled, or non-cryomilled, with slightly larger average particle sizes occurring when using non-cryomilled processing.

FIGS. 2A and 2B detail this process for charring the hemp, beginning with cutting hemp 30 and rough chopping hemp 31. In certain embodiments, activated carbon material is advantageous and thus, an optional step is determining if chemical activation needs to occur 32. If yes, then chemically activate 33 (addition of a salt, base, or acid, as known to those of ordinary skill in the art), if no, add to the furnace 34. Then heating the char to a temperature of more than 600 C 35, and then optionally activating 37 (e.g. with steam activation) or simply milling the char 39. The material is added to the ball mill 40 and milled in the ball mill 41 under standard temperatures or via cryo milling 42. Preferably, if activation is needed, then steam activation is utilized.

Here, the material can either be classified (in order to create mixtures of greater precision with regard to particle size) 44, and certain materials rejected 43 and re-milled and accepted fractions collected. Otherwise, the material from the milling step will be added to a polymer and the material combined and milled again to form the nanocomposites. This can again be performed at standard temperatures or under CMA conditions. This material is now a composite, comprising portions of polymer and of the hemp and the composite is collected 47.

Figure 4A:
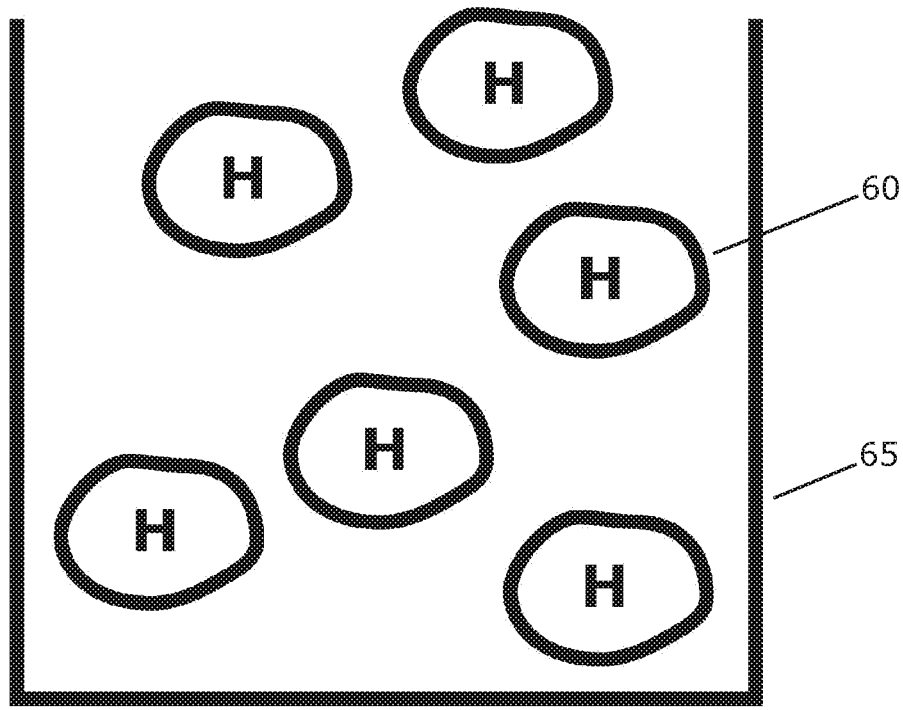
FIGS. 4A-4D depict a milling process, with 4A depicting hemp, 4B depicting hemp particles, 4C depicting a combination of hemp and polymer particles, and 4D depicting formation of hemp/polymer composites.
Figure 4B:
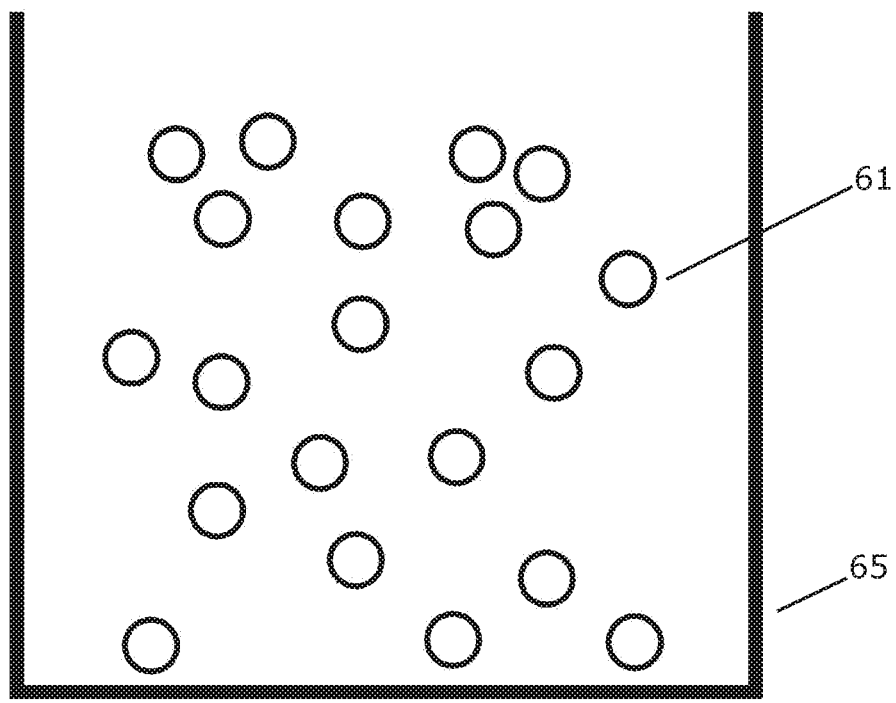

An example of the composite formation process is provided in FIGS. 4A-D. FIG. 4A depicts hemp component 60 within a milling chamber 65. This will preferably be the charred hemp, whether hurd or hurd and fibers. The hemp component 60 is milled in the chamber 65 resulting in a reduction in hemp particle size. For non carbonized hemp, this step is preferably performed at sub-zero temperatures, such as under liquid nitrogen, in a cryo milling process, otherwise a room temperature is sufficient for charred hemp. FIG. 4B depicts a subsequent step after milled into smaller hemp particles 61, within the chamber 65. These are the particles with average size of less than 20 microns, and preferably less than 10 microns, less than 5 microns, less than 2 microns, and less than 1 micron, with some particles as small as 0.001 micron size.

Figure 4C:
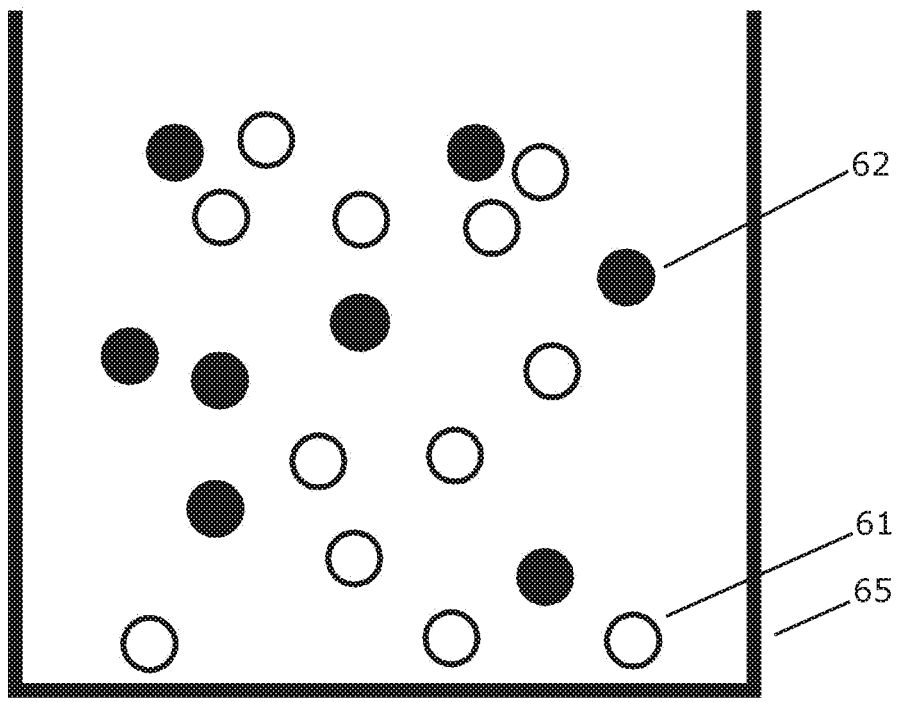
Figure 4D:
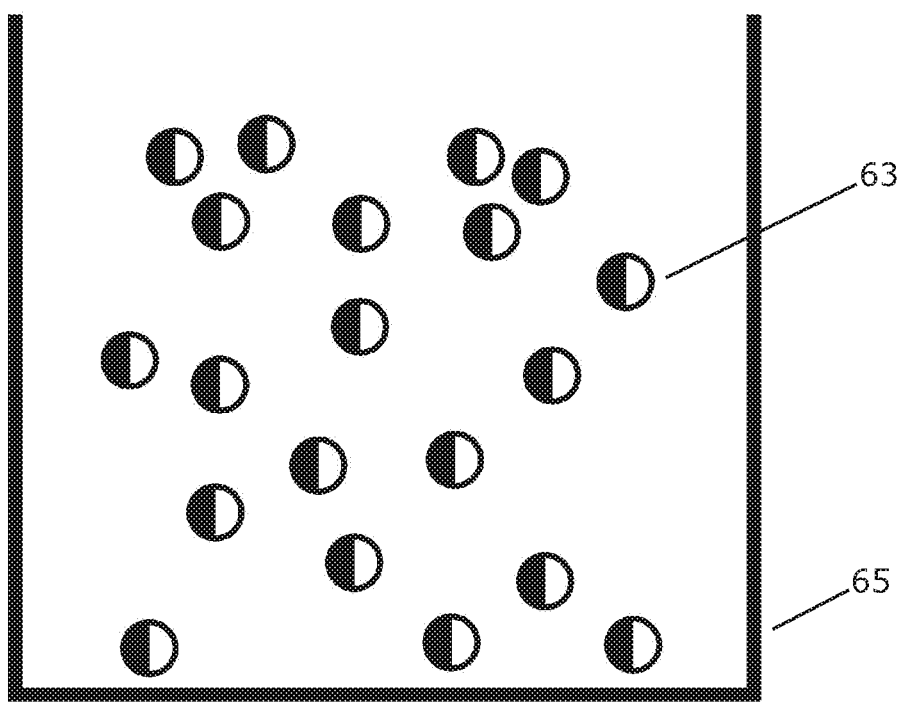

FIG. 4C then depicts the combination of hemp particles 61 with polymer particles 62 within the chamber 65. Thus, a mass of hemp particles 61 can be measured and an appropriate amount of each of the hemp particles 61 and polymer particles 62 can be added together to create a suitable concentration for the material—e.g. preferably between 1 and 50% of the hemp, and most preferably between about 1 and 20%. Finally, after milling the hemp particles 61 together with the polymer particles 62, FIG. 4D depicts that each combined particle 63 is now itself a composite, comprising hemp and polymer in each composite particle. This material is now advantageously utilized in a post processing molding step, wherein injection molding or extrusion molding, or other polymer molding process is performed in order to mold the combined composite particle 63 into a useable article.

It is important to note that this alloying process results in each particle becoming a composite of polymer and hemp (or carbonized hemp), creating individual nanocomposite particles 63 that can be subsequently processed into macroscopic composite structures as depicted in FIG. 4D. Essentially, the formation of the composites ensures that there are particles of polymer and of hemp in close proximity to one another thereby providing for unique properties for the resulting materials.

Indeed, this is valuable as the mechanical and electrical properties, where the percolation threshold is met can be utilized because of the small size of these polymers and their interaction with one another.

Materials and Methods

The hemp fiber fillers of the present embodiments are compatible with numerous polymer matrices. In certain embodiments, biodegradable polymers are utilized, for example poly-lactic acid (PLA). PLA is a biodegradable thermoplastic polymer. Biodegradable means that the polymer can degrade in natural environments. Thermoplastic means that the polymer can be melted and reformed without breaking the chemical structure of the polymer. PLA is produced by a synthesis of monomers that are bio-derived (typically corn based (Mofokeng et al. 2011)), which is more sustainable. Compared to other biopolymers, PLA has many benefits. It can have drastic energy savings, be recycled back to lactic acid, be produced into a hybrid paper-plastic to be compostable and has decreased $CO_2$ emissions (Jamshidian et al. 2010). The thermal degradation temperature of PLA is above 200° C. and the glass transition temperature and melting temperature are 55° C. and 175° C., respectively, and the processing temperatures can be from 185-190° C. Furthermore, from the first heating cycle of the differential scanning calorimeter (DSC), the glass transition temperature, the cold crystallization temperature, melting temperature and crystalline percent were 54.1° C., 90° C., 175° C., and 19.2%, respectively. In the second heating cycle of the DSC, the cold crystallization temperature, melting temperature and crystalline percent were 86.7° C., 171.7° C., and 32%, respectively.

PLA may be chosen over other polymers due to its mechanical properties, appearance and low toxicity. PLA has better mechanical properties when compared to polypropylene (PP) a non-biodegradable polymer in certain applications. The tensile strength of PLA and PP is 62 MPa and 36 MPa, respectively. The modulus of PLA and PP is 2.7 GPa and 1.2 GPa, respectively.

Some of the ways PLA's properties can be improved is by blending it with other polymers, heat treatment of the PLA, or applying high pressure to the PLA. Blending with other polymers produces a blend that has better properties. For example, in the Journal of Vinyl and Additive Technology, the blending of PLA and PP was analyzed. They took biodegradable PLA and blended it with non-biodegradable PP. The blended polymer will have better biodegradability than pure PP (Ebadi-Dehaghani et al. 2014).

PLA can be heat treated by keeping the PLA composite samples in a hot air oven at 80° C. for 3 days before testing. The heat treatment improved the dynamic modulus and thermal stability by changing the matrix crystallinity (Mathew et al. 2006). Another way to improve the properties of PLA is to change the PLA crystallinity at high pressures. Zhang and others used a DSC to compare the crystallinity of PLA under a high pressure of 300 MPa to a normal pressure of 5 MPa. The higher pressure allowed for the melting point to raise 7° C. from 165.1° C. to 172.2° C. The higher melting temperature allows for the polymer to crystallize for longer. Also, the high pressure allows for more uniform crystals to form due to the longer melting endotherm. There was a double melting peak seen in the high-pressure PLA. When conducting more tests, they determined the first melting peak was from the melting of imperfect crystals and the second larger melting peak was due to the thicker portions of the PLA crystallizing (Zhang et al. 2012). Overall, there are various ways to change or control the properties of PLA.

Lastly, it is important to note that when processing the polymer, injection molding is the least damaging compared to a continuous extrusion process where the polymer may be stretched (Jamshidian et al. 2010). Polymers can behave in different ways under similar conditions. It is key to ensure that the polymers are not changing their structure, unknowingly, when processing them. This could lead to non-uniform parts or weak spots throughout the polymer (Mathew et al. 2006).

Test Methods

There are various standard test methods that numerous researchers utilize to measure properties of materials. In this research, the DSC, TGA and DMA were the main testing techniques used to measure thermal and mechanical properties of the nanocomposites. Electrical testing can be conducted on a small scale with a multimeter or on a larger scale with four-point probe methods. Also, there are several ways to carbonize biomass and mill biochar. The following sections include details of tests methods performed by researchers that were models for selecting test procedures for this research.

There is a paucity of research on the inclusion of sustainably derived hemp carbon filler material with biodegradable polymers such as PLA. Nor is there any research on the composite process using hemp and PLA as defined by the embodiments herein, comprising milling the polymer, milling the hemp, and then milling the polymer and hemp together to form composites. The research presented here builds on the substantial work in the polymer and composite field by investigating the use of carbonized hemp in a polymer matrix. Several polymers were tested, for efficacy including PVC, PP, and PLA, and combinations of PP and PLA as well as others. The tests below utilize PLA in particular as the polymer for the composite matrix.

PLA pellets were heat pressed into sheets and cut into ~3 cm squares before being cryomilled. A single layer of PLA pellets was sandwiched between aluminum foil which was treated with mold release. A Hotronix Fusion Heat Press was used to melt the PLA pellets into thin sheets. The heat press was set to 221° C. and the PLA sample was held at temperature for 5 minutes.

The hemp was carbonized using a Lindberg Blue M Tube Furnace fitted with a continuous nitrogen flow line to minimize atmospheric oxygen. The furnace was set to ramp from 25° C. to 1100° C. in about 1 hour at a rate of about 14° C.-20 C min$^1$ and then held at 1100° C. for one hour. The initial hemp mass that was put into the furnace was approximately 4 grams and the final carbonized hemp mass was approximately 0.8 grams. There was approximately 80% mass loss during carbonization.

A Retsch Cryomill was used to prepare the carbonized hemp nanocomposites. A 50 mL stainless-steel jar with 3 stainless steel balls with diameters of 15 mm were used. The cryomill was oscillated for 15 minutes at a frequency of 30 Hz in a liquid nitrogen environment at a temperature of ~196° C. The heat pressed PLA was cryomilled individually before the carbonized hemp was added. To make the nanocomposite, the cryomilled PLA and an appropriate volume of carbonized hemp was added to the jar and milled for 15 minutes at 30 Hz. Volume percentages of carbonized hemp were calculated based on a carbon density of 2.1 g/cm$^3$ (Boylan 1996) and a PLA density of 1.25 g/cm$^3$. The target compositions of carbonized hemp were: 0, 1, 2, 3, 4, 5, 7, and 10%. Processing volume percentages in excess of 10% was problematic due to the extremely small particle size of the biochar. During cryomilling, biochar powder would escape the stainless-steel jar through the screw threads, resulting in erroneously low volumes of biochar in the composite.

A Model B-100 Benchtop Injection Molder was purchased from Galmob Inc. The maximum temperature of the molder is 316° C. and the injection tube capacity is 1 cubic inch (16 cm$^3$). Before injection molding, the material was dried in an oven for 2-3 hours at 75° C. The injection mold melt chamber temperature was set according to the volume percentages of the nanocomposite (See Table 1 below for temperatures) and the powder composite filled the melt chamber. The aluminum mold was machined to produce 3 sample bars in one shot. Each bar had the dimensions of 29 mm×7.94 mm×1.93 mm. The aluminum mold was preheated at 176° C. for 5 minutes and mold release spray was applied. Once the melt chamber reached the set temperature, the handle was pulled down to inject the material into the mold. The mold was cooled for 10-20 seconds before removing the injection molded composite bars, subsequently referred to as molded bars.

TABLE 1

Injection mold set temperatures for target compositions of nanocomposites.

| | Target Composition (vol %) | | | | | | | |
|---|---|---|---|---|---|---|---|---|
| | 0% | 1% | 2% | 3% | 4% | 5% | 7% | 10% |
| Set Temperature (° C.) | 210 | 210 | 206 | 206-207 | 207 | 208 | 204 | 201 |

Test Methods

Figure 5:
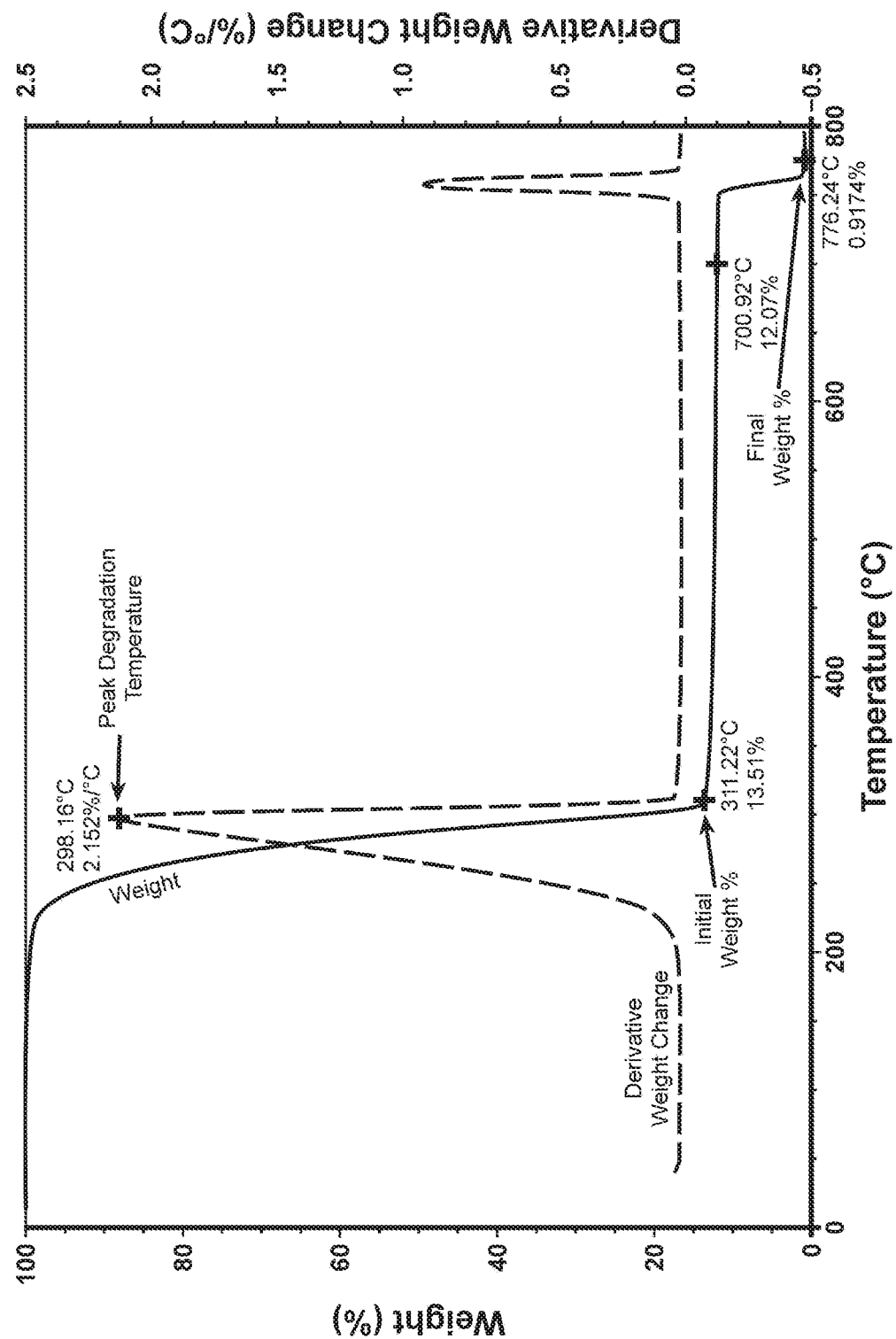
FIG. 5 depicts a representative TGA of the composite powder with a target composition of 10 vol % of biochar.

A Q50 thermal gravimetric analyzer (TGA) from TA Instruments was used to measure the peak degradation temperature and calculate biochar loading in the composite. The TGA was set to ramp at 5° C. min$^{-1}$ from 25° C. to 800° C. in a nitrogen environment and oxygen was introduced at 700° C. to ensure complete combustion of the sample. Both the powders and the molded bars were analyzed in triplicate for each biochar loading composition. FIG. 5 is a representative TGA of the composite powder with a target composition of 10 vol % of biochar. The graph in FIG. 5 is annotated to show how peak degradation temperature, the first weight percent and the residual weight percent were measured using the resulting TGA plots. The measured compositions were calculated from the initial weight percent minus the final weight percent at 775° C. The initial weight percent is the biochar content leftover after the PLA has been degraded while under nitrogen conditions. The final weight percent represents the residual mass of the sample that is left over after oxygen is introduced. The difference is the weight percent of biochar in the sample, which is then converted into volume percent.

Figure 6:
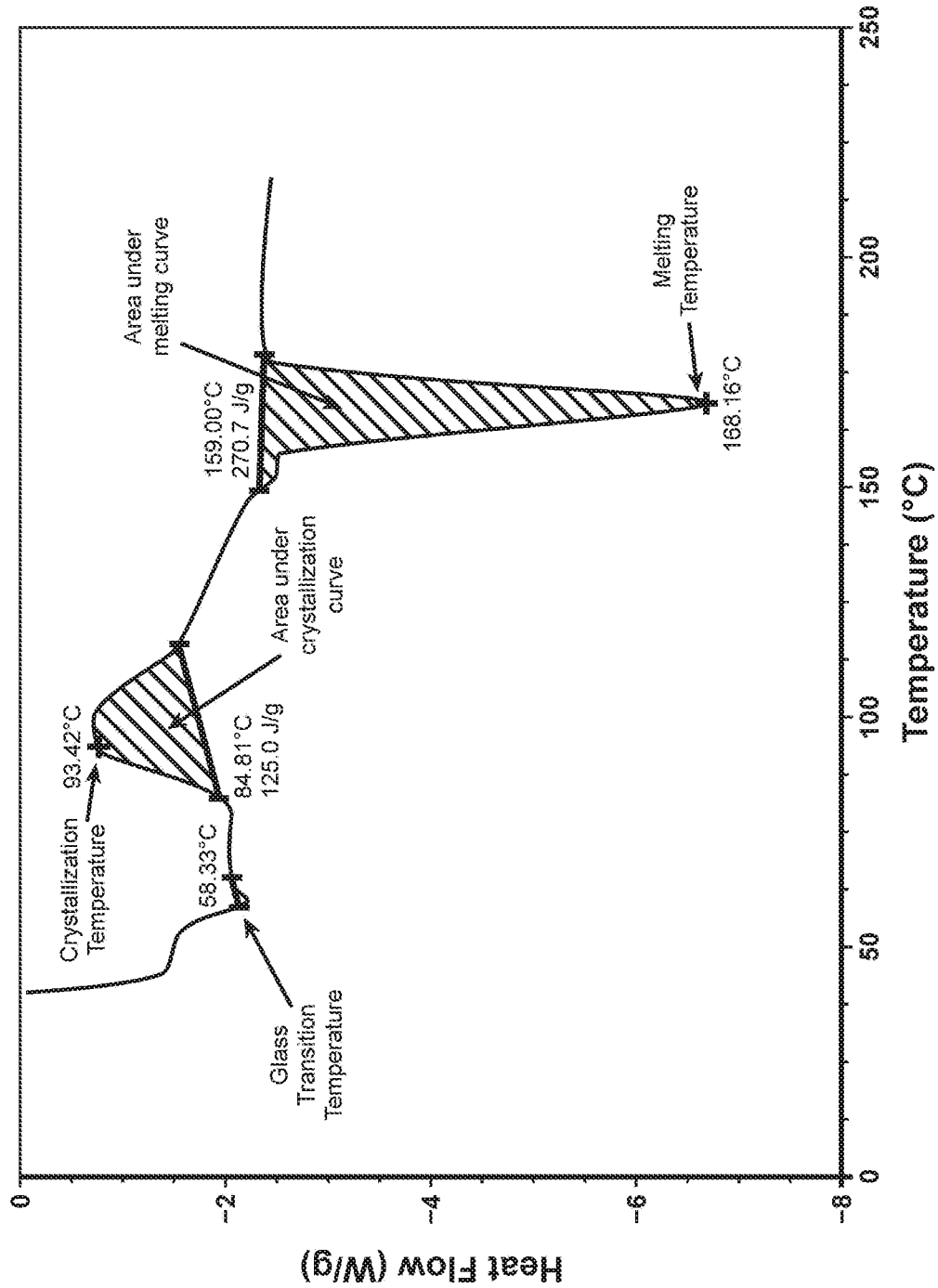
FIG. 6 demonstrates an example of a second DSC run with 10 vol % of biochar powder composites.

A Q200 differential scanning calorimeter (DSC) from TA Instruments was used to measure the glass transition temperature, crystallization temperature, melting temperature and crystallinity of PLA. DSC experiments were run with two cycles. In the first cycle, the sample is heated from 25° C. to 220° C. at a ramp of 10° C. min$^{-1}$. The samples were allowed to cool and then a second cycle of heating at the same ramp temperature was completed. The powders were analyzed in triplicate for each composition. The molded bars were analyzed once per volume percentage. FIG. 6 demonstrates an example of a second DSC run with 10 vol % of a biochar powder composite. FIG. 6 is annotated with where the glass transition temperature ($T_g$), the crystallization temperature ($T_c$), the melting temperature ($T_m$), the area under the crystallization curve and the area under the melting temperature curve was measured. The percent crystallinity was calculated by dividing the area under the curve (J/g) of the crystallinity peak by the area under the curve of the melting peak. The quotient is the portion of the crystallizable polymer that did not crystallize in processing. Subtracting the quotient from one determined the fraction of the polymer that was already crystallized before the test. $T_g$, $T_m$, and $T_c$ were measured the same way in the $1^{st}$ and $2^{nd}$ runs, however, as per Mofokeng, the first heating cycle data was used to determine the crystallinities and the second cycle was used to determine the melting temperatures.

Figure 7:
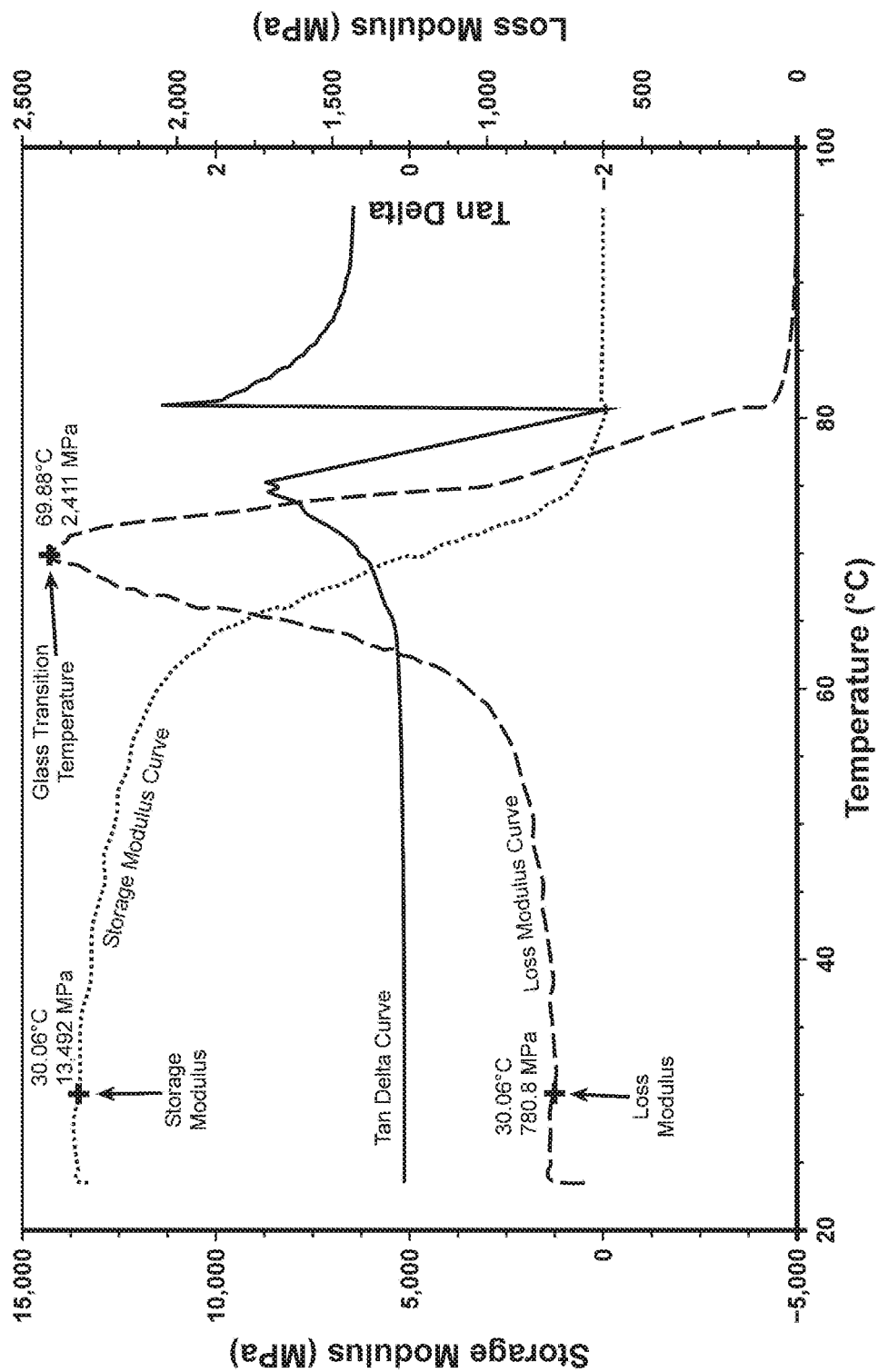
FIG. 7 depicts an annotated representation of DMA graph of a 10 vol % composition nanocomposite molded bar.

A Q800 dynamic mechanical analyzer (DMA) from TA Instruments was used to measure the storage modulus, loss modulus, and glass transition temperature. The tension film clamp was used with a sample size of ~29.80×7.91×1.93 mm. In this process, the samples were heated from 25° C. to 100° C. at a rate of 5° C. min$^1$ with controlled strain and frequency set at 1 Hz. Three samples of each volume percent were analyzed. FIG. 7 demonstrates an example of a DMA graph with a 10 vol % composition composite bar. FIG. 7 is annotated where the $T_g$, storage modulus and loss modulus were measured in each test. The $T_g$ can be measured at either the peak loss modulus or the peak tan delta. In this work, the peak loss modulus was used to determine the $T_g$ as noted in FIG. 7.

A FEI Quanta 600 FEG Mark II Environmental Scanning Electron Microscope (ESEM) at the Singh Center for Nanotechnology at the University of Pennsylvania was used to obtain microscope images of the nanocomposite powders and molded bars.

Electrical testing was performed with a Fluke 287 Multimeter to measure resistivity and capacitance of the molded composite bars. The injection molded composites were sanded to remove surface skin and painted with an electrically conductive silver epoxy adhesive (AA-DUCT 906) manufactured by Atom Adhesives. The conductive epoxy was painted on the bars prior to testing to ensure contact between the alligator clips and the composite bars.

Physical Properties

The variability of the molded bars was evaluated by weighing the samples for each volume percentage. In Table 2, the mass of the bars and the standard deviation is presented. The small standard deviation shows that the masses have low variability for each composition. In addition, the average mass decreases with the increase in biochar loading. The decrease in mass could indicate processing difficulty or air bubbles in higher biochar compositions.

TABLE 2

Summary of average mass and standard deviations of injection molded bars.

| Molded bars Measured vol % | Average Mass (g) | Std. Dev. Of Mass (g) |
| --- | --- | --- |
| 0.0 | 0.573 | 0.003 |
| 1.7 | 0.571 | 0.008 |
| 2.5 | 0.546 | 0.001 |
| 3.7 | 0.547 | 0.001 |
| 4.0 | 0.544 | 0.002 |
| 5.3 | 0.542 | 0.004 |
| 6.5 | 0.554 | 0.006 |
| 8.5 | 0.553 | 0.007 |

Figure 8:
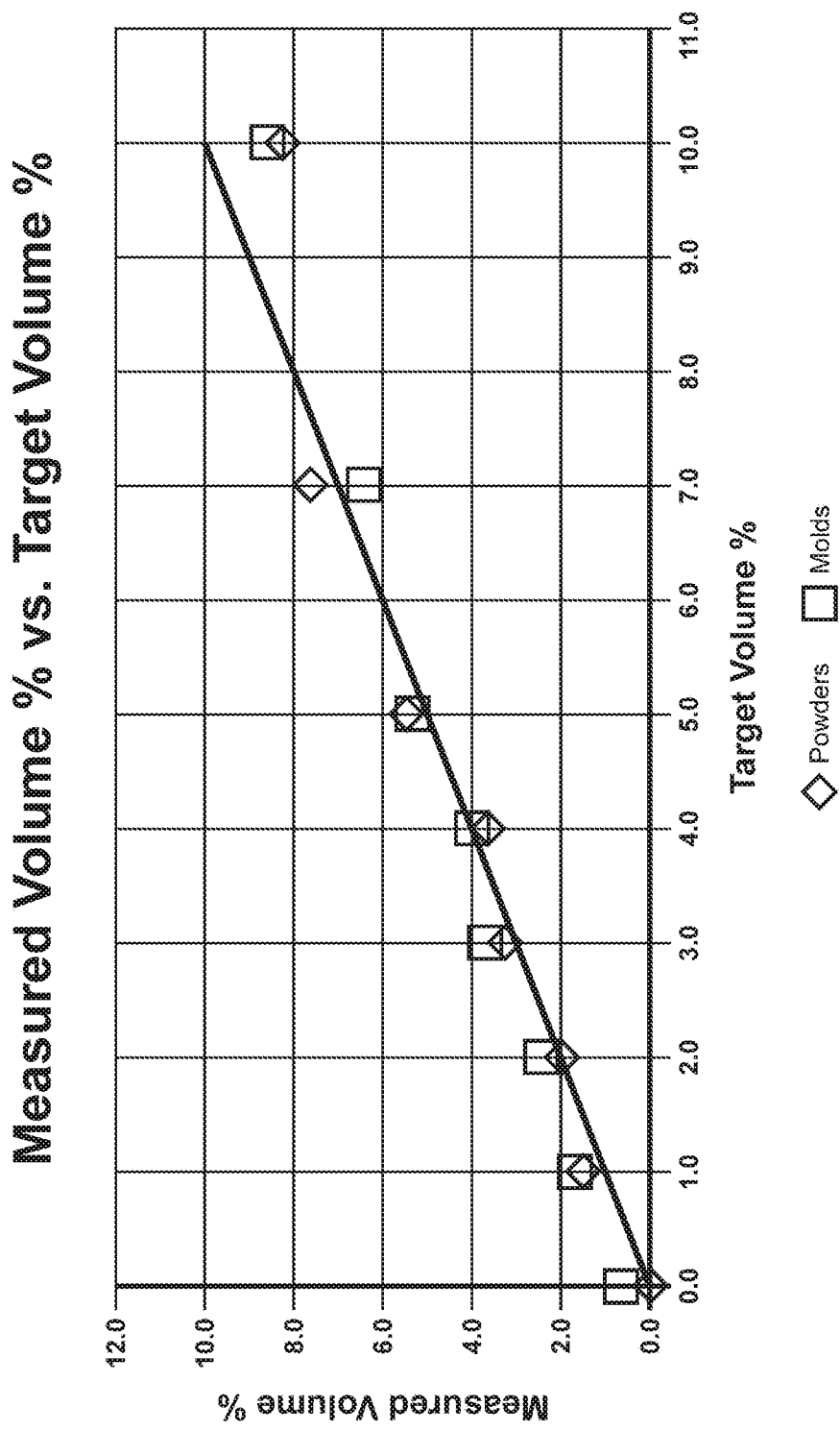
FIG. 8 depicts a comparison of measured and targeted volume percentages of biochar in powders and molded bars.

The actual volume percentages of the composites were calculated from the TGA results. FIG. 8 and Table 3 compare the targeted volume percent to the measured volume percent for the composite powder and molded samples. Overall, the measured volume percentages were slightly higher than the targeted volume percentages, with the exception of 10 vol %. In addition, the molded bars have a slightly higher volume percentage compared to the powders, which could be caused by excess biochar in the injection mold melt chamber between runs. The target composition of 0% resulted in a measured composition of 0.68% which could be explained by potential additives in the original polymer that did not combust at 775° C. There were no adjustments made to the other compositions to account for any polymer residual mass.

Processing Cryomilled Nanocomposite Powder

The nanocomposite powder can be processed in multiple ways to construct a final thermoplastic product. Melt processing and filament extrusion for 3D printing are two low-cost methods for product construction. To 3D print with the cryomilled nanocomposite powder, it needs to be extruded into a filament. In this process, the powder is melted and drawn through an extruder to produce a continuous filament of a desired diameter. Filament extrusion conditions vary as a function of polymer matrix and percent of hurd filler used in the nanocomposites. Varying the volume of nanofiller changes the strength, stiffness and brittleness of the resulting composite. Extrusion temperature and speed were chosen to yield a filament that ranged from 1.5 to 2 mm in diameter, however the precise diameter can be amended based on the necessary use of the material.

Injection molding was also utilized to produce nanocomposite solids. Cryomilled powder was placed into the hopper, heated to initiate flow, injected, and cooled.

In one embodiment, the following settings were utilized for manufacture of a material. However, those of skill in the art will recognize that the settings are mere examples, and that variables such as temperature, humidity and then like will affect the results. Those of skill in the art will recognize necessary modifications to these parameters based on the specific variables in their setting.

Polylactic Acid (PLA 3D850): ~1.75 mm for TIKO 3D Printer

PLA (3D850): begin at 182° C. extrusion, 184° C. preheat. Glass transition temperature ranges from 55-60° C.

When PLA begins to 'glob' out of nozzle, lower to 180° C. extrusion, 182° C. preheat (range for PLA is 180° C.-200° C.)

Filament may occasionally fluctuate up to 2 mm for this particular test.

The settings are variable depending on things like humidity and temperature in the room, moisture in the polymer, etc. Accordingly, those of skill in the art will recognize that modifications can be made to the above based upon the particular nature of the material and the desired resulting product.

Acrylonitrile Butadiene Styrene (ABS): ~1.75 mm for TIKO 3D Printer

Filament may occasionally fluctuate up to 2 mm

ABS: begin at 190° C. extrusion, 193° C. preheat (range for ABS is 175° C.-190° C.)

The above settings can be utilized in methods of the present disclosure for extruding nano composite materials using the polymers as described herein. Those of skill in the art will recognize the modifications suitable under these embodiments to generate a composite material having different properties, but utilizing the materials as described herein.

Nanocomposite Material Testing

The nanocomposite powders, filaments, and printed objects were analyzed using a thermal analysis suite, including thermogravimetric analysis (TGA), differential scanning calorimetry (DSC), and dynamic mechanical analysis (DMA) to identify any degradation during processing and to characterize viscoelastic properties of the nanocomposites, including dynamic modulus. Dielectric constant and electrical resistance of extruded filaments and printed structures was also determined for carbon nanocomposites.

A FEI Quanta 600 FEG Mark II Environmental Scanning Electron Microscope (ESEM) at the Singh Center for Nanotechnology at the University of Pennsylvania was used to obtain microscope images of the nanocomposite powders and molded bars.

Electrical testing was performed with a Fluke 287 Multimeter to measure resistivity and capacitance of the molded composite bars. The injection molded composites were sanded to remove surface skin and painted with an electrically conductive silver epoxy adhesive (AA-DUCT 906) manufactured by Atom Adhesives. The conductive epoxy was painted on the bars prior to testing to ensure contact between the alligator clips and the composite bars.

TABLE 3

Target volume percentages compared to average measured volumes percentages of powders and molded bars.

| Target Vol % | Measured Powder Vol % | Measured Molded Bar Vol % |
| --- | --- | --- |
| 0.0 | 0.0 | 0.7 |
| 1.0 | 1.5 | 1.7 |
| 2.0 | 2.0 | 2.5 |
| 3.0 | 3.3 | 3.7 |
| 4.0 | 3.7 | 4.0 |
| 5.0 | 5.5 | 5.3 |
| 7.0 | 7.7 | 6.5 |
| 10.0 | 8.3 | 8.6 |

Electrical Properties

When molded composites were tested, no conductivity or resistivity was found. When carbonized hemp hurd was tested directly in its powdered form, it was found to have a low resistivity (10-80 ohms). Therefore, the distribution of biochar particles within the PLA matrix was not sufficient to create a network capable of conductivity or capacitance. Therefore, the percolation threshold was not reached. Other researchers have noted that the filler content must be above the percolation threshold to obtain a conductive network. A filler content as high as 10-50% by weight may be necessary to form a continuous network (Ma et al. 2010; Kalaitzidou et al. 2010).

Thermal Properties
Peak Degradation Temperature

Figure 9:
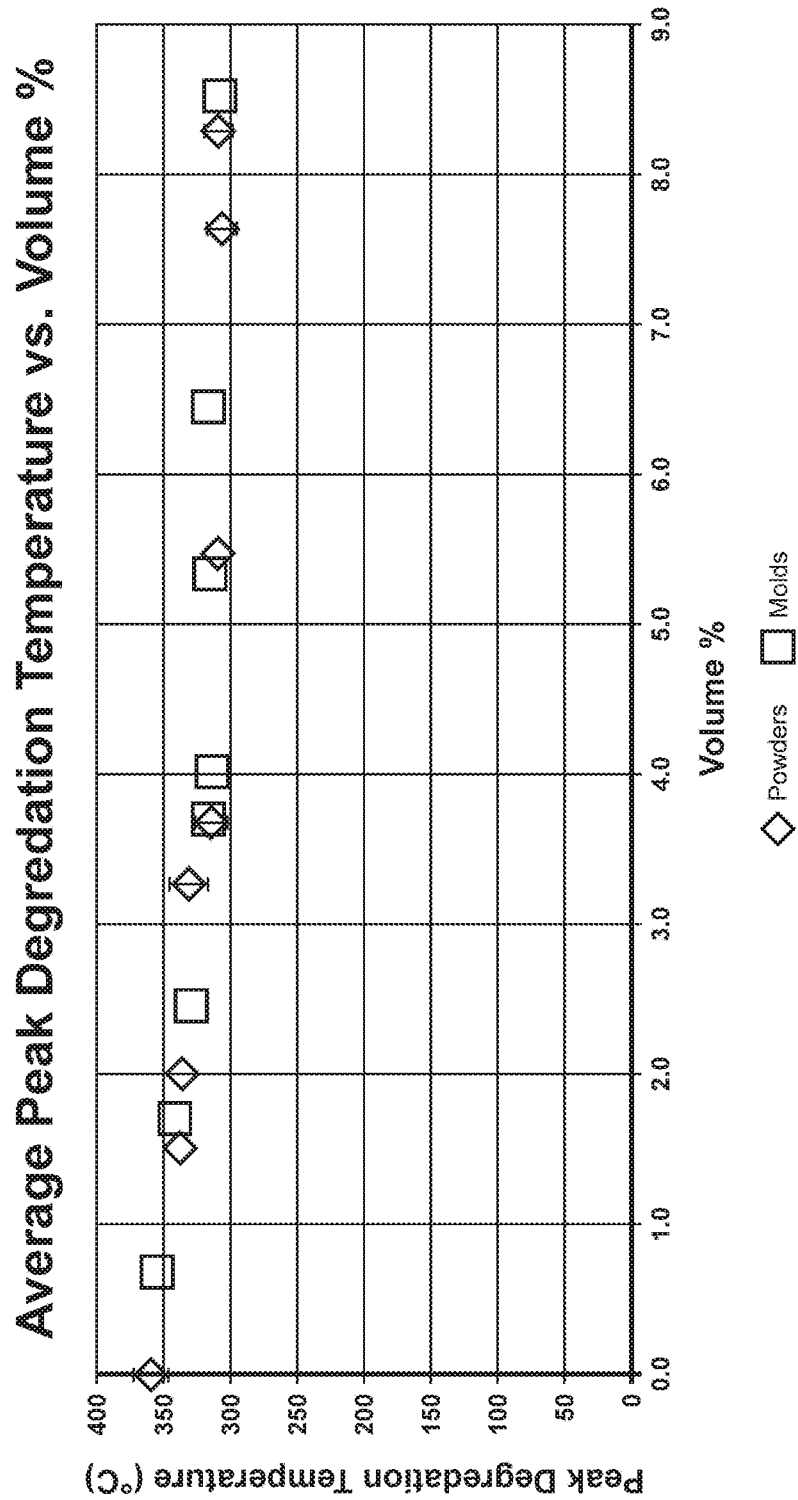
FIG. 9 depicts a comparison of average peak degradation temperatures versus the volume percentages of biochar in the composite powder and molded bars.

The peak degradation temperature was measured with the TGA for both the powders and the molded bars. The peak degradation temperature decreased with increasing biochar particles in the powders and molded bars (see FIG. 9). FIG. 9 has error bars of +/−1 standard deviation (as do all subsequent graphs). In the powders, the peak degradation decreased from 358° C. at 0.0 vol % to 308° C. at 8.3 vol %. Similarly, in the molded bars, the peak degradation decreased from 355° C. at 0.7 vol % to 307° C. at 8.3 vol %. The decrease in peak degradation could be due to the biochar loading causing heat transfer to happen more rapidly, degrading the polymer more quickly.

Glass Transition Temperature

Figure 10:
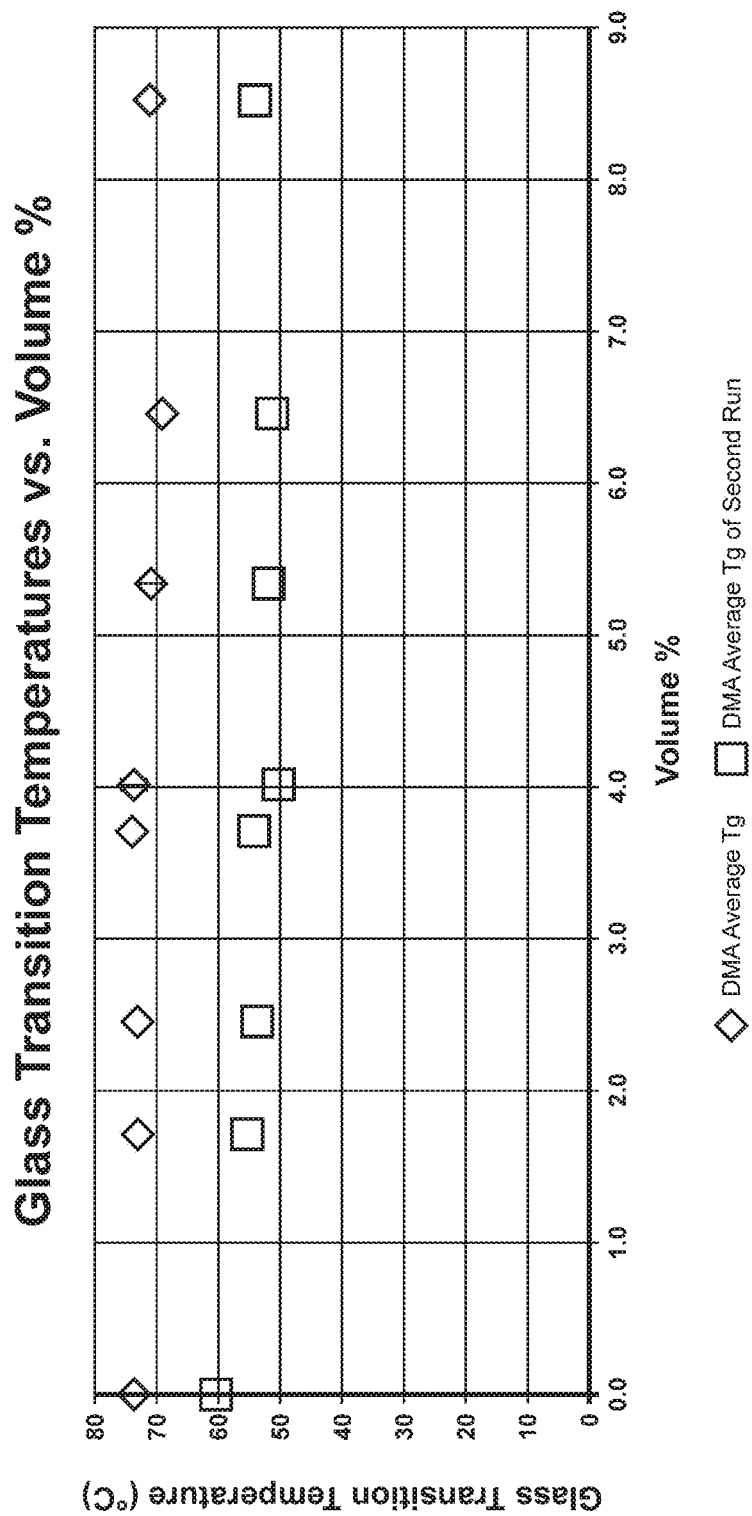
FIG. 10 depicts a comparison of glass transition temperatures measured from the DMA and the DSC versus the volume percentages of biochar in the composite molded bars.

The glass transition temperature ($T_g$) was measured with the DSC and the DMA. Overall, the $T_g$ measured from the DSC was lower than that measured from the DMA. In FIG. 10, the $T_g$ measured from the DSC and TGA are compared for the composite molded bars. There is a slight decrease in $T_g$ with the increase in biochar content measured with both instruments. The DMA measurements are higher than the DSC measurements which agrees with TA Instruments procedures (TA Instruments).

Crystallization Temperature & Crystallinity Fraction

In Table 4, the crystallization temperatures ($T_c$) of the powders and molded bars are displayed. $T_c$ slightly decreased with the increase of biochar content in both the molded bars and the powders. A possible explanation for the lower $T_c$ could be that the biochar particles are enhancing the rate of crystallization. The DSC is a dynamic test which ramps up the temperature therefore the crystals form quicker and have the surfaces of the biochar particles to grow on. The difference of the $T_c$ from powders to molded bars is due to the form each material is in. The heat transfers differently through a solid molded bar compared to a powder. The second heating cycles are more comparable because each material has been melted and cooled down similarly.

TABLE 4

Crystallization temperatures of composite powders and molded bars.

| Measured vol % of Biochar in Powder | Crystallization Temperature (°C.) | Measured vol % of Biochar in Molded Bars | Crystallization Temperature (° C.) |
| --- | --- | --- | --- |
| 0.0 | 101 | 0.7 | 125 |
| 1.5 | 99 | 1.7 | 93 |
| 2.0 | 99 | 2.5 | 92 |
| 3.3 | 99 | 3.7 | 94 |
| 3.7 | 98 | 4.0 | 91 |
| 5.5 | 99 | 5.3 | 93 |
| 7.6 | 98 | 6.5 | 96 |
| 8.3 | 98 | 8.5 | 94 |

Figure 11:
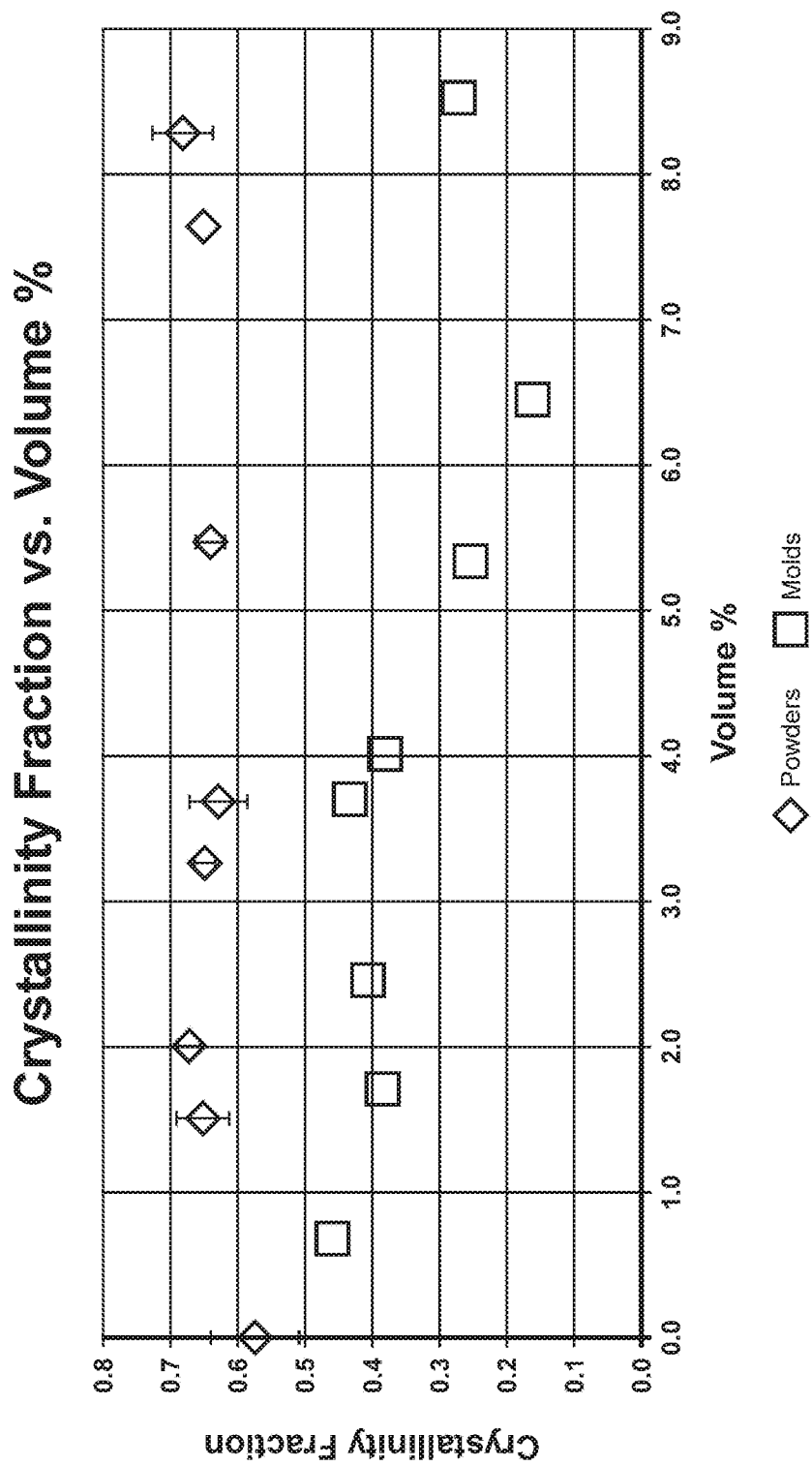
FIG. 11 depicts crystallinity fraction of powders and molded bars.

The crystallinity fraction of the powders and molded bars are shown in FIG. 11. Overall, the crystallinity fraction is less in the molded bars than in the powders. A possible explanation for the lower crystallinity in the molded bars is that the molded bars had less time to crystallize when injection molded. The powder is melted and quenched rapidly into the mold to form the molded bars which leaves less time to crystallize.

Melting Temperature

In general, the melting temperature slightly decreased with the increase of biochar content in both the molded bars and the powders. The melting point of unreinforced PLA is approximately 175° C. (Garlotta 2001), which agrees with the 0.0 vol % sample in this study. In Table 5, the melting temperatures for both the powders and molded bars are listed. The decrease in melting temperature was also seen when injection molding the molded bars. There are a few possible explanations for the slight decrease in melting temperature. One explanation is that the biochar particles transfer heat better, which was also noted in the peak degradation analysis above. The conductive biochar particles could be transferring heat throughout the composite creating an efficient way to melt the polymer with less added heat. Also, the biochar particles may be lowering the viscosity of the composite when injection molding. As stated earlier, when the biochar loading increased the injection molding process became more difficult. The temperature of the injection mold melt chamber needed to be lower or the material would become less viscous and run out of the nozzle without applying pressure. (Aljaafari et al. 2011) found that the complex viscosity was lower for CNP than CNT because of the high aspect ratio of CNT (Aljaafari et al. 2011). Another explanation could be that the polymer has a slightly lower molecular weight as a result of the processing it has undergone, which would lead to a lower peak degradation temperature and lower the melt viscosity.

TABLE 5

Crystallization temperatures of composite powders and molded bars

| Measured vol % of Biochar in Powder | Melting Temperature (° C.) | Measured vol % of Biochar in Molded Bars | Melting Temperature (° C.) |
| --- | --- | --- | --- |
| 0.0 | 176 | 0.7 | 176 |
| 1.5 | 174 | 1.7 | 167 |
| 2.0 | 172 | 2.5 | 164 |
| 3.3 | 169 | 3.7 | 165 |
| 3.7 | 169 | 4.0 | 160 |
| 5.5 | 172 | 5.3 | 162 |
| 7.6 | 167 | 6.5 | 158 |
| 8.3 | 171 | 8.5 | 162 |

Melting Temperature

In general, the melting temperature slightly decreased with the increase of biochar content in both the molded bars and the powders. The melting point of unreinforced PLA is approximately 175° C. (Garlotta 2001), which agrees with the 0.0 vol % sample in this study. In Table 5, the melting temperatures for both the powders and molded bars are listed. The decrease in melting temperature was also seen when injection molding the molded bars. There are a few possible explanations for the slight decrease in melting temperature. One explanation is that the biochar particles transfer heat better, which was also noted in the peak degradation analysis above. The conductive biochar particles could be transferring heat throughout the composite creating an efficient way to melt the polymer with less added heat. Also, the biochar particles may be lowering the viscosity of the composite when injection molding. As stated earlier, when the biochar loading increased the injection molding process became more difficult. The temperature of the injection mold melt chamber needed to be lower or the material would become less viscous and run out of the nozzle without applying pressure. Aljaafari et al. (2011) found that the complex viscosity was lower for CNP than CNT because of the high aspect ratio of CNT (Aljaafari et al. 2011). Another explanation could be that the polymer has a slightly lower molecular weight as a result of the processing it has undergone, which would lead to a lower peak degradation temperature and lower the melt viscosity.

Figure 12:
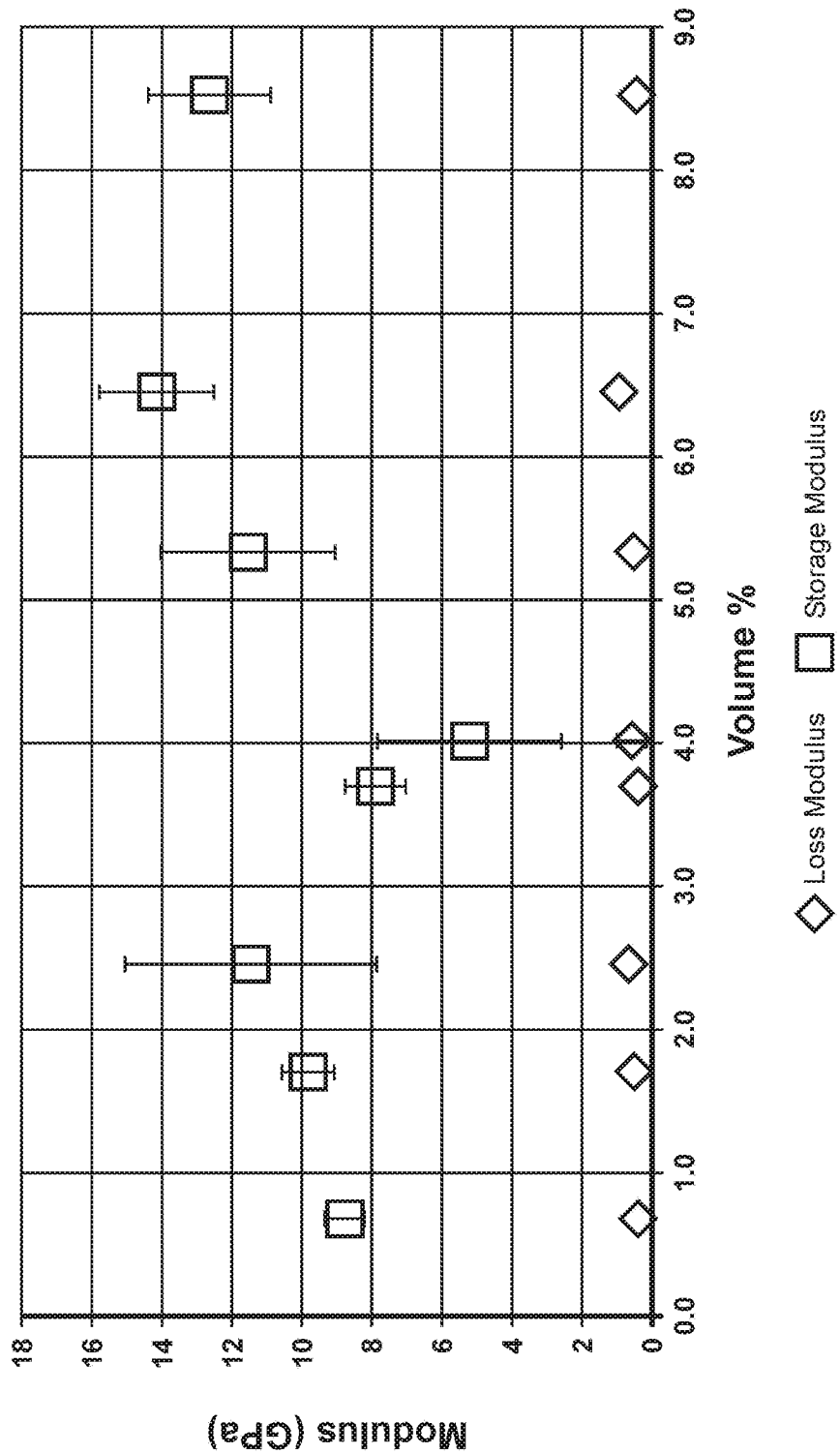
FIG. 12 depicts a comparison of loss and storage modulus versus volume percent.

The initial storage (E') and loss (E") moduli were recorded at 30° C. during the DMA testing. FIG. 12 is a graph of the storage and loss modulus versus the biochar loading. The complex modulus ($E_c$) was calculated using equation 1 and is a function of frequency and temperature.

$$E_c = \sqrt{(E')^2 + (E'')^2} \qquad \text{Eq. 1}$$

Figure 13:
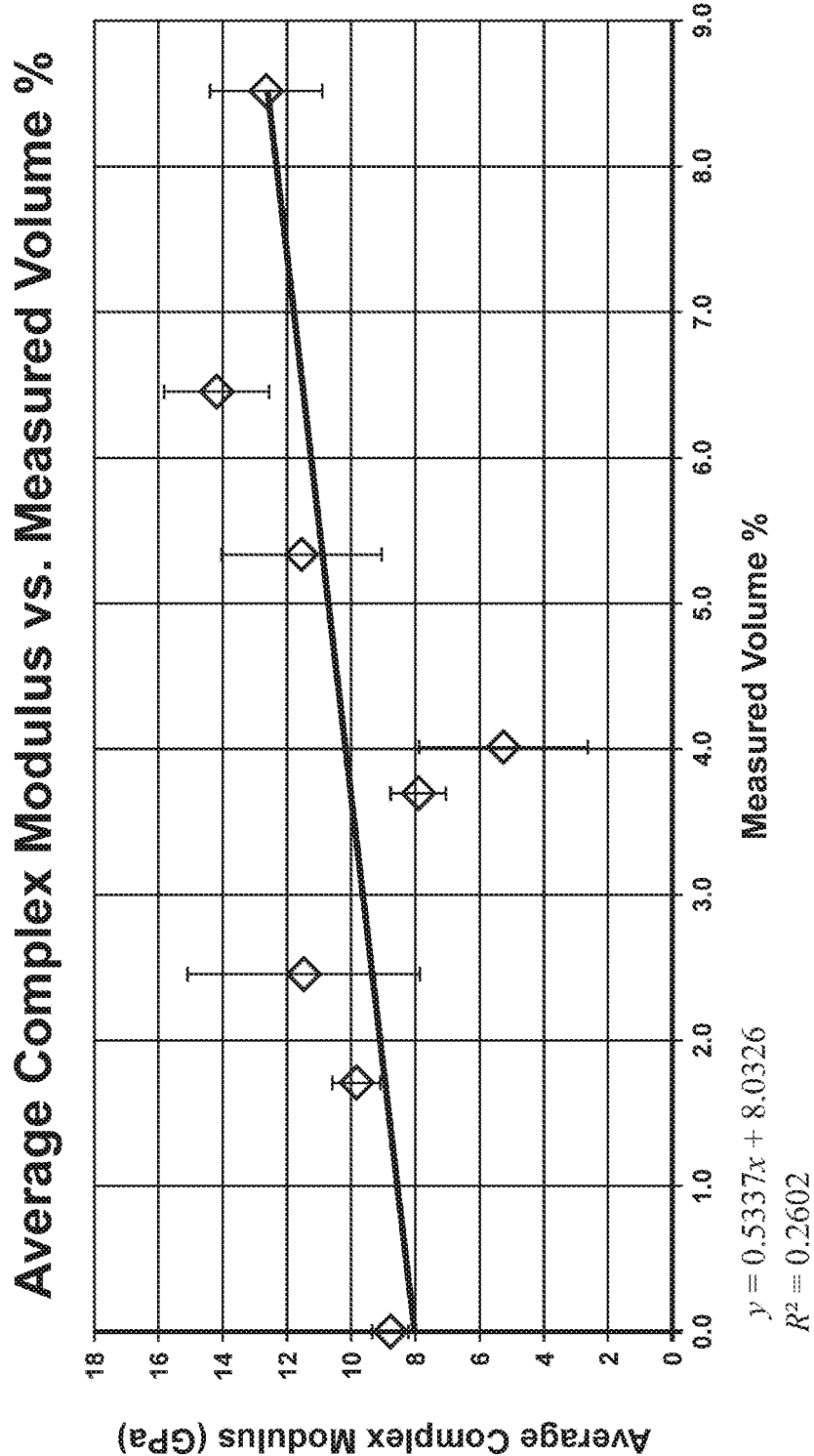
FIG. 13 depicts a graph of complex modulus versus volume percent.

FIG. 13 shows the average complex modulus versus the volume percentage of biochar loading. The complex modulus generally increased from 9 GPa to 13 GPa with the increase in biochar content. Notice that the $R^2$ value in FIG. 13 is 0.26. The $R^2$ value measures how close the data is to the line best fit to the data. Having a low $R^2$ value of 0.26 means that the data does not correlate with the best fit line very well. However, when calculating Pearson's correlation coefficient, the r value equates to 0.51. Pearson's coefficient uses an equation that compares the values in the data set to each other rather than to a best fit line. A Pearson's correlation coefficient of 0.51 indicates a moderate correlation between complex modulus and volume percent of biochar. Pearson's correlation coefficient is a better representation of the correlation of the data.

Modeling

Three models were used in this research to predict the modulus of the composite while fitting to the experimental data. The rule of mixtures, inverse rule of mixtures and the Halpin Tsai models were compared with the experimental data to draw conclusions about the modulus of the composite.

Rule of Mixtures & Inverse Rule of Mixtures

The Rule of Mixtures (ROM) is a way to predict the elastic modulus of a continuous fiber reinforced composite taking into consideration the filler volume fraction ($v_f$), the modulus of the filler ($E_f$) and the modulus of the matrix ($E_m$). The modulus of the composite should fall somewhere in between the upper and lower limits. The ROM equation is the upper limit (equation 2) and the inverse rule of mixtures (IROM) is the lower limit (equation 3). The upper limit boundary represents the modulus when the fibers are aligned parallel to the stress/force. The lower limit boundary represents the modulus when the fiber alignment is perpendicular to the stress/force. The composite modulus should lay somewhere between the upper and lower limit. In this work, it was assumed that the modulus of the filler and the modulus of the matrix are not changing as a function of biochar loading. The 4% composition was excluded in modeling this data. The 4% composition had a high standard deviation, large scatter and the average moduli were not consistent with the rest of the data.

$$E_{c,UL} = E_f v_f + (1 - v_f) E_m \qquad \text{Eq. 2}$$

$$E_{c,LL} = \frac{E_m E_f}{v_f E_m + (1 - v_f) E_f} \qquad \text{Eq. 3}$$

A blended model (equation 4) was used to represent a particulate filled composite. There is an assumption that the modulus of randomly oriented filler composite will fall between the upper (ROM) and lower (IROM) limits. The alpha level is typically between 0 to 1. Equation 4 was used to fit the experimental data and allowed for the calculated modulus of the upper limit ($E_{c,UL}$), calculated modulus of the lower limit ($E_{c,LL}$) and alpha to be free variables. Equation 4 was used to solve for the modulus of the filler, the modulus of the matrix and an alpha level by minimizing the sum of the squares of the error between the model and the experimental data.

$$E_{c,calc} = \alpha E_{c,UL} + (1 - \alpha) E_{c,LL} \qquad \text{Eq. 4}$$

Figure 14:
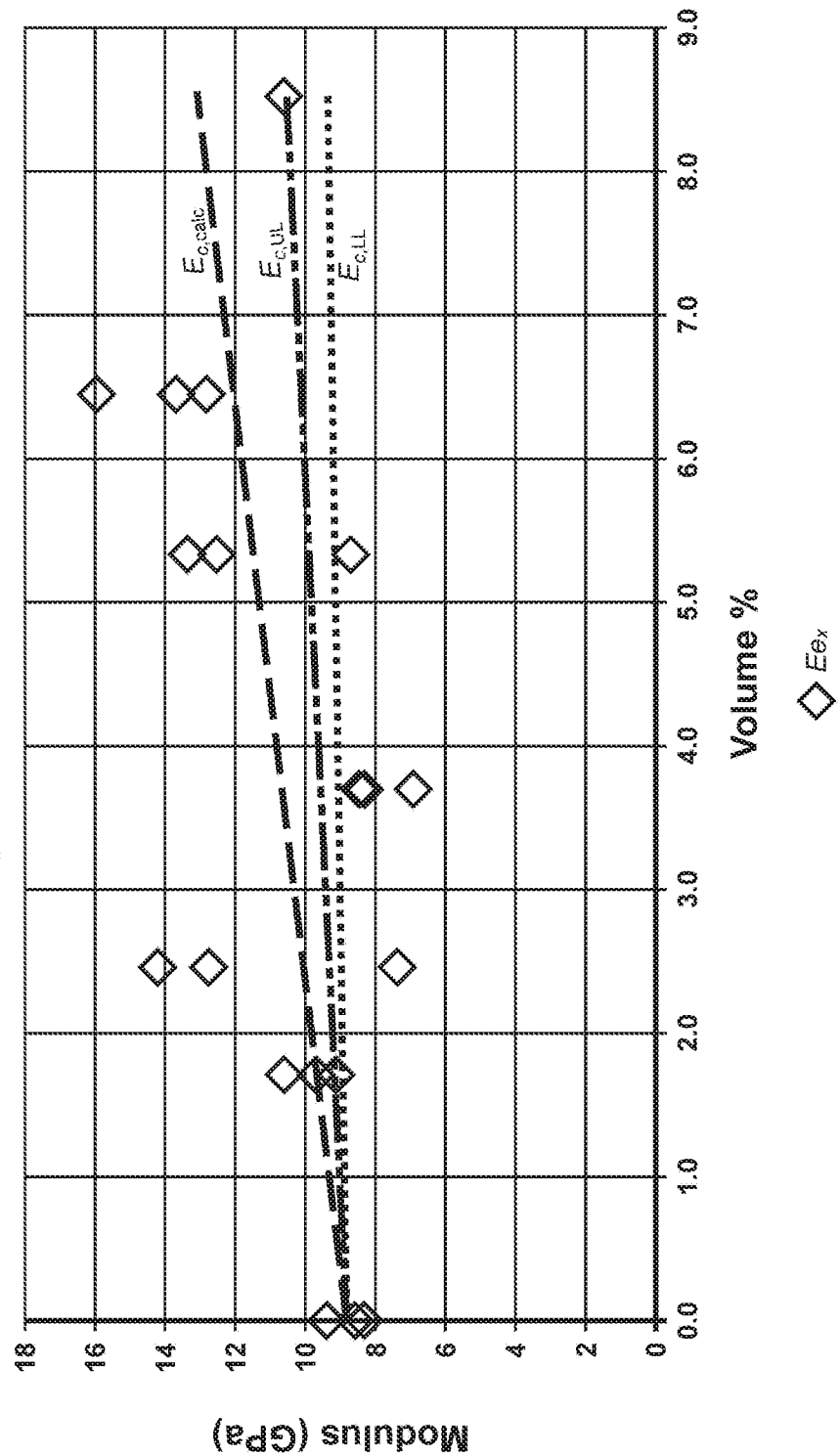
FIG. 14 depicts comparisons of modulus using rule of mixtures, inverse rule of mixtures and blended model.

Using this model, the alpha level was calculated to be 2.97 based on the averages of complex moduli from the DMA. An alpha level greater than 1 means that the modulus of the composite is greater than the upper limit. In this case, the large alpha means that the modulus is above the upper limit. Further explanation of this result will be given later in the discussion section of this report. By using the model, the modulus of the filler was determined to be 31.1 GPa and the modulus of the matrix to be 8.7 GPa. The modulus of carbon/graphite is stated to be 27.6 GPa (Boylan). The modulus of PLA is stated to be 2-4 GPa in the literature (Kamthai and Magaraphan 2015; Shakoor et al. 2013). In FIG. 14, the upper limit ($E_c$ UL), lower limit ($E_c$ LL) and calculated modulus (E calc) are presented on the graph with the data points ($Ee_x$).

In addition, the modulus of the filler and polymer were calculated directly from the data results. With 8.5 vol % of biochar loading and the filler modulus calculated to be 30.0 GPa, the ROM equation calculated the modulus of the polymer to be 11.4 GPa. Vis versa, the filler modulus calculated would be 59.3 GPa based on the 8.5 vol % biochar loading composite with a polymer modulus of 8.7 GPa. These results compared to literature values states above show that either the polymer modulus is changing with biochar loading or the modulus of the biochar is very high. This result will be expanded upon in the discussion section.

Halpin Tsai Model

The Halpin Tsai equation was also used to model the experimental data. Halpin Tsai is a semi-empirical equation (Affdl et al. 1976) (equation 5) used to calculate the elastic modulus of a composite.

$$E_c = E_m \frac{1 + AB v_f}{1 - B v_f} \qquad \text{Eq. 5}$$

$$B = \frac{\frac{E_r}{E_m} - 1}{\frac{E_r}{E_m} + 2\frac{l}{t}} \qquad \text{Eq. 6}$$

$$A = 2\frac{l}{t} \qquad \text{Eq. 7}$$

Figure 15:
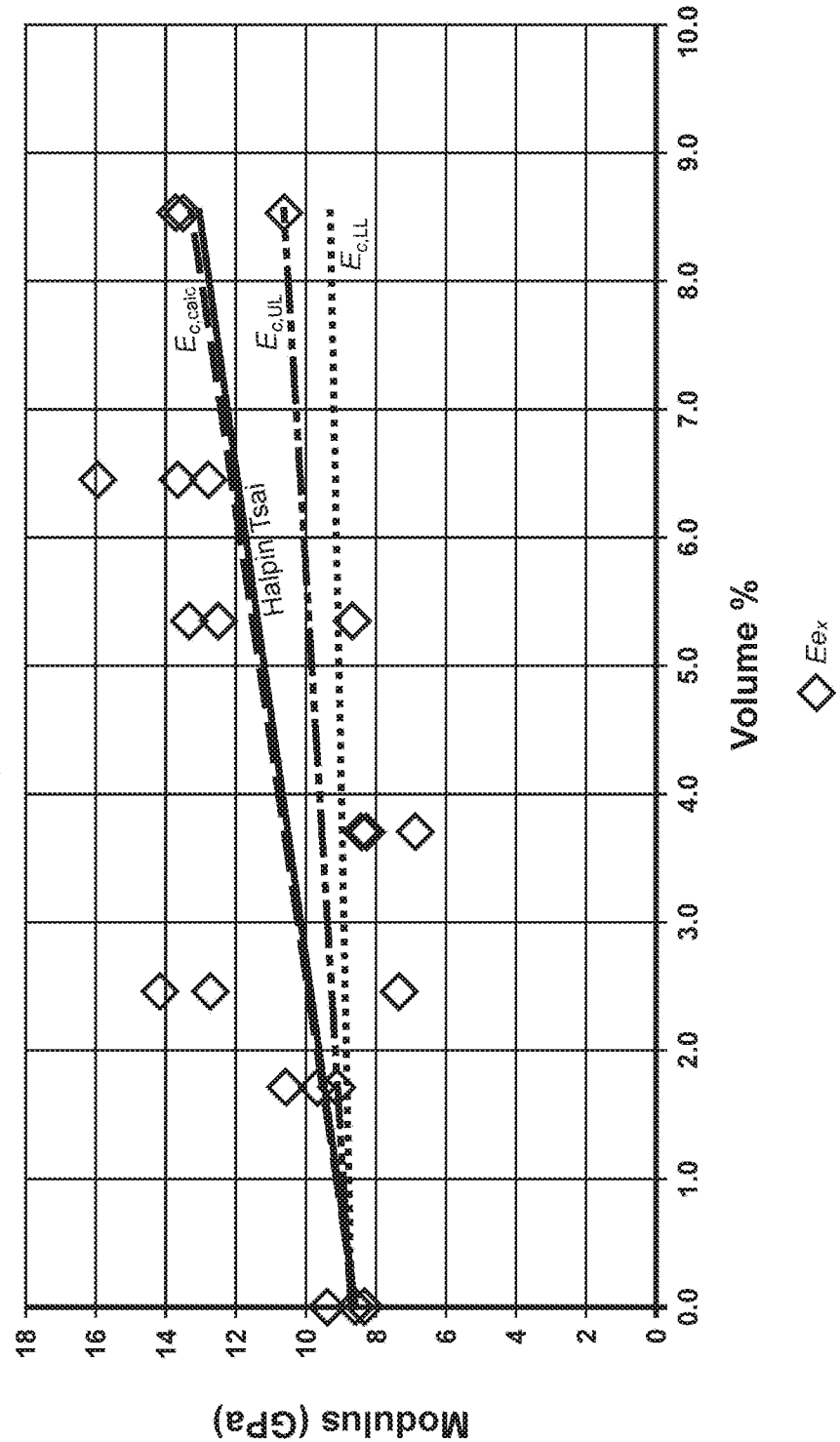
FIG. 15 depicts comparisons of modulus from rule of mixtures, inverse rule of mixtures, blended model and Halpin Tsai equation.

The constant A is dependent on the particle shape and matrix Poisson ratio. The constant B is dependent on the modulus of the particle and the modulus of the matrix (Fu et al. 2008). Constant A was calculated to be 6.86 and constant B was calculated to be 0.728. Equation 6 and equation 7 were used to solve for the length (l), thickness (t) and modulus of the particles ($E_f$). The length to thickness ratio and modulus of the particles were calculated to be 3.4 and 176.7 respectively. The thickness ratio of 3.4 means that the length of the particles are 3 times longer than it is thick which is consistent with the ESEM images. FIG. 15 is a graph of the rule of mixtures model and the Halpin Tsai equation with the data points plotted. The calculated ($E_c$) from the rule of mixtures and the Halpin Tsai equations are similar.

Accordingly, the embodiments herein describe a process for manufacturing a composite material comprising hemp and a polymer. The process includes the following steps: milling the cellulose (hemp) to an average particle size of between 0.001 and 100 microns, preferably with an average particle size of 100, 75, 50, 30, 25, 20, 15, 10, 5, 2, 1, or less than 1 microns. After milling the cellulose to such size, the cellulose is combined with a volume of polymer into a milling chamber. Preferably, the combination is between 1 to 99% of polymer, and 1-99% of the milled particles. The combination is then milled together, resulting in a material having particles, that themselves are composites.

In preferred embodiments, the cellulose is milled via cryomilling. In certain embodiments, the cellulose is carbonized and milled. In certain embodiments, the carbonized cellulose is further cryomilled. In certain embodiments, the polymer is combined with the cellulose at re-milled at room temperature, at cryomilling temperatures (such as in liquid nitrogen, or using dry ice chambers, or at above room temperature.

In a preferred embodiment, a composite material comprising at least 5% of hemp-based bio composite material; wherein the composite itself is made up of a plurality of individual particles each of which are composites of hemp and at least one polymer. Wherein the composite material is suitable for extruding or molding at an appropriate temperature based upon the polymer utilized within the composite.

In a preferred embodiment, the hemp-based portion comprises between 1 and 10% of the total mass of the composite, and the hemp is cryomilled to form a particle size averaging less than 2 microns in size. In a further preferred embodiment, the hemp is charred and the milled to form a particle size of less than 2 microns in size. In either embodiment, the hemp at a particle size of less than 2 microns in size is added to a mill with a portion of polymer and milled together to create a hemp/polymer composite. In preferred embodiments, the hemp/polymer composite material is then extruded or molded into a composite article.

Applications:

This hemp-reinforced nanocomposite will ultimately provide added strength and stiffness to a material. Thus, possible applications for this material exist in most current traditional uses of thermoplastics. Use in automotive and aeronautical industries, consumer goods, packaging, and construction applications are all potential markets.

Biodegradable and sustainable composites are easily formed by the methods and processes described herein and the resultant composite of biodegradable polymer (e.g. PLA, or others), and hemp can be modified to fit any number of applications based on particular needs. Advantageously, this composite, however, can biodegrade naturally, when exposed to atmospheric elements, including water at a controlled weight.

In other embodiments, the filler of hemp material can be combined with non-biodegradable polymers such as PP, and form materials intended for external applications that will have atmospheric contact. Coatings may be advantageously added to extend the life of the material, as known to those of ordinary skill in the art.

Carbon Based Nanocomposites have Certain Electrical Properties.

The ability of nanocomposites composed of carbonized hemp to conduct electricity and/or act as a capacitor will have significant importance for numerous commercial applications. Conductive polymers are of interest in antistatic applications in uses ranging from petrochemical processing/storage to electronic circuitry protection. There are also many applications where 3D printed carbon-reinforced nanocomposites could be used for electromagnetic interference shielding and smart textiles and wearables. For example, such materials may be utilized for biometric monitoring via smart fabrics or fabric-based induction charging for electronic devices. Simply, carbon is a conductive material, and when used in sufficient percentages, Carbonized materials.

Carbonized hemp, while containing some of the same properties as the cellulosic material described above, also includes electrical properties. As a material is carbonized, we take a non-conductive cellulosic material and generate one that possesses electrical properties. This allows for generation of a hemp-based carbon material that can act as a capacitor, or simply to transmit electrical charges through the material. Of course, in some settings, the electrical property is highly problematic and so carbonized material will not be appropriate for all settings.

The electrical properties are generated by ensuring a sufficient percentage of carbonized hemp within the composite. When used at a low percentage of carbonized hemp, e.g. 1%, the carbonized material, the carbon percentage is of such a low density within the entire composite that only weak electrical properties are generated, and we reported negligible amounts of conductive properties with 1% hemp hurd. The percentage was increased to 5%, with slight improvements in conductivity resistance. We repeated these tests at 10% hemp hurd, and the conductive properties are increased, but remain below a level above 100Ω, which is insufficient for reliable use as a conductive material.

To improve the properties two factors were amended. First, the char temperature of the material was increased. Increasing the char to above 1100 C dramatically decreased the resistance and created a better material for transmitting electrical signals. Furthermore, charring a material that combined both the hemp hurd and hemp fibers, surprisingly also decreased the resistance. Thus, taking whole hemp stalk, which comprises both hurd and fibers, charring at above 1100 C, and then milling, resulted in materials having increased electrical properties.

Furthermore, the hemp filler was increased the ratio to 85:15, with 15% hemp and using such an amount of hemp generates a sufficient density of carbonized material to allow for the particles to be in appropriate contact to reach the percolation threshold. However, using the improved 1100 C stalk material allowed a material above 10% hemp particle filler to reach the percolation threshold. Thus, both the process of carbonizing the material and the higher percentages of carbonized hemp increased the conductivity, and capacitive properties of the material.

Accordingly, certain goods are suitable for manufacture with this carbonized, electrically conductive material, when the percentage of carbonized hurd is greater than 15% of the total weight of the material. Furthermore, percentages of 20, 25, 30, 35, 40, 45, 50, 60, 70, 80, 90, and 99% are all suitable for conductive materials.

Interestingly, in addition to the electrical properties of the carbonized material, certain subtle physical properties are also different. For example, the carbonized material has different properties than the cellulosic material with regard to stiffness. When used in equal amounts, i.e. 20% carbon 80% polymer as compared to 20% cellulosic to 80% polymer, the carbon-based material would be stiffer than the cellulosic version. Thus, depending on the particular use of material, the carbon based hemp particles generated stiffer materials and also materials that show lower electrical resistance.

Mechanical Properties

Those of skill in the art will recognize the different mechanical properties defined herein. Composite materials made from cryomilled hemp and from carbonized hemp have different resulting properties. Therefore, those of skill in the art will recognize the necessary property for the specific application.

This research investigated the electrical and mechanical behaviors of nanocomposites composed of carbonized hemp and a polymer. When hemp hurd was charred at 600 C, there were no capacitive or conductive properties at up to 10% hemp particles within the composite. However, by increasing the char temperature to above 1100 C, and use of whole hemp stalk, which includes both hemp hurd and fiber, electrical properties were met, wherein materials with a resistance of less than 100Ω were generated.

However, all composites, regardless of electrical properties showed surprising mechanical properties. The composite molded samples did show deviations in average complex modulus as biochar volume percent increased. Ultimately, the complex modulus is higher than one would expect from model predictions at the same volume fractions. Thus, the composite provides a stiffer material than predicted based on the use of the hemp and polymer nanocomposites than for other materials.

Furthermore, the high alpha value in the blended model indicates that the modulus of the nanocomposite is above the upper limit calculated by ROM. Furthermore, the results indicate the modulus of the filler to be greater than 30 GPa. In the ROM model, the biochar modulus was calculated to be 59.3 GPa at a biochar content of 8.5%. In the Halpin Tsai model, the modulus was calculated to be 176.7. GPa. Both of these models suggest that the biochar modulus is much greater than the biochar modulus found in literature. Therefore, the results define that the carbonized hemp hurd, or hemp stalk have a larger modulus than other carbon materials.

Accordingly, hemp-derived biochar and PLA were successfully cryomilled into nano-scaled composites with targeted composition ranging from 0-25% hemp filler. The physical, electrical, thermal and mechanical properties were examined through TGA, DSC, and DMA testing procedures. In general, the nanocomposites became stiffer with the introduction of the biochar particles. This could be due to two reasons. Either the modulus of the polymer is changing with increasing biochar loading or the modulus of the filler is higher than anticipated. The biochar nanocomposites also exhibited decreases in peak degradation, glass transition, crystallization and melting temperatures. Overall, the presence of the biochar altered the material's thermal and mechanical properties. The electrical percolation threshold was met in this research after increasing the char temperature above 1100 C and by incorporating at least 10% of the hemp char into the composite.

What is claimed is:

1. A composite material comprising a polymer and a hemp char filler, wherein the hemp char filler is produced by carbonizing a portion of hemp at a temperature of at least 1100° C. to produce a hemp char; and milling the hemp char to produce the hemp char filler having an average particle size of between 0.001 and 10 microns; adding into hemp char filler a portion of polymer and milling the hemp char filler and polymer together to form the composite material, wherein the hemp char filler comprises 95% of particles of between 0.001 and 10 microns in size; and wherein the hemp char filler comprises between 1% and 50% of the total mass of the composite material; and wherein the composite does not contain silanes or a dispersing agent to disperse the hemp particles into the polymer before forming the composite material.

2. The composite of claim 1, wherein the hemp particle filler comprises an average particle size of less than 2 microns.

3. The composite of claim 1, wherein the milling comprises a cryomilling process.

4. The composite of claim 1, wherein the hemp char filler is included at a sufficient density in the composite material wherein the resistance of the composite is less than 100Ω.

5. The composite material of claim 1, wherein the composite material is extruded into a composite article.

6. A method of manufacturing a hemp based composite particles comprising: processing a portion of polymer to generate a polymer particle having an average particle size of between 0.001 and 10 microns, using a 30 Hz processing in an oscillating mill; processing a portion of hemp by cryomilling said hemp under liquid nitrogen at 30 Hz; and combining a portion of the polymer particle and a portion of the cryomilled hemp and milling them together at 30 Hz to form composite particles.

7. The method of claim 6, wherein the composite particles are further processed by extrusion or molding to form a composite article.

8. The method of claim 6, wherein the average particle size of the polymer particle is no more than 2 microns.

9. The method of claim 6, wherein the average particle size of the cryomilled hemp is no more than 2 microns.

10. The method of claim 6, wherein a composite particle comprises between 1 and 50% of the cryomilled hemp.

11. The method of claim 10, wherein the composite material has a resistance of less than 100Ω.

12. The method of claim 6, wherein the polymer is selected from a biodegradable polymer, a non-biodegradable polymer, or combinations thereof.

13. The method of claim 6, wherein the portion of hemp is a carbonized hemp.

14. The method of claim 13, wherein the carbonized hemp is charred at a temperature of greater than 600° C. under an inert gas.

15. The method of claim 6, wherein the polymer is acrylonitrile butadiene styrene, polylactic acid, polyethylene terephthalate, polypropylene, or combinations thereof.

* * * * *